(12) United States Patent
Strutton

(10) Patent No.: US 11,483,265 B2
(45) Date of Patent: Oct. 25, 2022

(54) SYSTEMS AND METHODS FOR ASSOCIATING SOCIAL MEDIA SYSTEMS AND WEB PAGES

(71) Applicant: Oracle International Corporation, Redwood Shores, CA (US)

(72) Inventor: Michael J. Strutton, Villa Rica, GA (US)

(73) Assignee: Oracle International Corporation, Redwood Shores, CA (US)

( * ) Notice: Subject to any disclaimer, the term of this patent is extended or adjusted under 35 U.S.C. 154(b) by 562 days.

(21) Appl. No.: 16/101,007

(22) Filed: Aug. 10, 2018

(65) Prior Publication Data

US 2018/0351892 A1 Dec. 6, 2018

Related U.S. Application Data

(63) Continuation of application No. 13/195,677, filed on Aug. 1, 2011, now abandoned, which is a (Continued)

(51) Int. Cl.
*G06Q 30/02* (2012.01)
*H04L 51/066* (2022.01)
*H04L 51/52* (2022.01)

(52) U.S. Cl.
CPC .......... *H04L 51/066* (2013.01); *G06Q 30/02* (2013.01); *H04L 51/52* (2022.05)

(58) Field of Classification Search
None
See application file for complete search history.

(56) References Cited

U.S. PATENT DOCUMENTS 5,749,081 A 5/1998 Whiteis
6,363,392 B1 3/2002 Halstead et al.
(Continued)

FOREIGN PATENT DOCUMENTS

WO 2012/058408 A2 5/2012

OTHER PUBLICATIONS

A Brief History of Social Media Platforms, by Carly Racklin, dated Oct. 2, 2018 (see p. 7), downloaded from https://streambankmedia.com/a-brief-history-of-major-social-media-platforms/ on Jul. 26, 2019 (Year: 2018).
(Continued)

*Primary Examiner* — Mathew R. Syrowik
(74) *Attorney, Agent, or Firm* — Invoke

(57) ABSTRACT

Systems and methods for the creation and management of electronic associations between social media systems and web pages. Such associations promote greater interactions between web page visitors and users of social media pages. A social graph management system (SGMS) receives information related to a web page, and creates associations between the web page and social media pages. A process of creating such associations involves configuration of social media software for insertion into the web page. Furthermore, creating associations also involves creation of an intermediary page (and related data structures) by the SGMS in order to direct traffic between the web page and social media pages. User activity in the web page is tracked in addition to web traffic arriving at the intermediary page at subsequent times for computation of various analytics.

18 Claims, 12 Drawing Sheets

High-level Overview of Social Graph Management System (SGMS)

Related U.S. Application Data continuation-in-part of application No. 12/859,675, filed on Aug. 19, 2010.

(60) Provisional application No. 61/369,560, filed on Jul. 30, 2010, provisional application No. 61/235,277, filed on Aug. 19, 2009.

(56) References Cited

U.S. PATENT DOCUMENTS

| | | |
|---|---|---|
| 6,636,861 B1 | 10/2003 | Stack |
| 7,599,935 B2 | 10/2009 | La et al. |
| 7,873,988 B1 | 1/2011 | Issa et al. |
| 7,974,983 B2 | 7/2011 | Goeldi |
| 8,214,272 B2 | 7/2012 | Glassman et al. |
| 8,230,062 B2 | 7/2012 | Newton |
| 8,296,380 B1 | 10/2012 | Kelly et al. |
| 8,312,056 B1 | 11/2012 | Peng et al. |
| 8,402,057 B2 | 3/2013 | Shin |
| 8,447,852 B1 | 5/2013 | Penumaka et al. |
| 8,473,422 B2 | 6/2013 | Shen et al. |
| 8,510,164 B2 | 8/2013 | Newton et al. |
| 8,554,635 B2 | 10/2013 | England et al. |
| 8,606,792 B1 | 12/2013 | Jackson et al. |
| 8,607,295 B2 | 12/2013 | Bhatia et al. |
| 8,620,718 B2 | 12/2013 | Varghese et al. |
| 8,631,473 B2 | 1/2014 | Bhatia et al. |
| 8,635,674 B2 | 1/2014 | Bhatia et al. |
| 8,650,587 B2 | 2/2014 | Bhatia et al. |
| 8,706,548 B1 | 4/2014 | Blume et al. |
| 8,843,610 B2 | 9/2014 | Newton |
| 8,856,056 B2 | 10/2014 | Di et al. |
| 8,856,165 B1 | 10/2014 | Cierniak |
| 9,117,058 B1 | 8/2015 | Ansari et al. |
| 2001/0040889 A1 | 11/2001 | Matsuzaki et al. |
| 2002/0032037 A1 | 3/2002 | Segawa |
| 2002/0069106 A1 | 6/2002 | Shopsowitz |
| 2003/0063072 A1 | 4/2003 | Brandenberg et al. |
| 2003/0120735 A1 | 6/2003 | Capiel |
| 2003/0187801 A1 | 10/2003 | Chase et al. |
| 2004/0003270 A1 | 1/2004 | Bourne et al. |
| 2004/0083133 A1 | 4/2004 | Nicholas et al. |
| 2004/0167926 A1 | 8/2004 | Waxman et al. |
| 2004/0168077 A1 | 8/2004 | Waxman et al. |
| 2004/0249815 A1 | 12/2004 | Lee |
| 2005/0018611 A1 | 1/2005 | Chan et al. |
| 2005/0044049 A1 | 2/2005 | Okayama et al. |
| 2005/0055341 A1 | 3/2005 | Haahr et al. |
| 2005/0091202 A1 | 4/2005 | Thomas |
| 2005/0097359 A1 | 5/2005 | Speare et al. |
| 2005/0119977 A1 | 6/2005 | Raciborski |
| 2006/0026655 A1 | 2/2006 | Perez |
| 2006/0074915 A1 | 4/2006 | Bhandarkar et al. |
| 2006/0085419 A1 | 4/2006 | Rosen |
| 2006/0143081 A1 | 6/2006 | Argaiz |
| 2006/0173788 A1 | 8/2006 | Nath et al. |
| 2006/0173957 A1 | 8/2006 | Robinson et al. |
| 2006/0229990 A1 | 10/2006 | Shimoji et al. |
| 2006/0248045 A1 | 11/2006 | Toledano et al. |
| 2006/0282328 A1 | 12/2006 | Gerace et al. |
| 2006/0294134 A1 | 12/2006 | Berkhim et al. |
| 2007/0043617 A1 | 2/2007 | Stein et al. |
| 2007/0067210 A1 | 3/2007 | Rishell et al. |
| 2007/0073937 A1 | 3/2007 | Feinberg et al. |
| 2007/0100779 A1 | 5/2007 | Levy et al. |
| 2007/0121843 A1 | 5/2007 | Atazky et al. |
| 2007/0124432 A1 | 5/2007 | Holtzman et al. |
| 2007/0150335 A1 | 6/2007 | Arnett et al. |
| 2007/0214097 A1 | 9/2007 | Parsons et al. |
| 2007/0250468 A1 | 10/2007 | Pieper |
| 2007/0256033 A1 | 11/2007 | Hiler |
| 2007/0297641 A1 | 12/2007 | Criddle et al. |
| 2008/0073936 A1 | 3/2008 | Jeng |
| 2008/0086439 A1 | 4/2008 | Brough et al. |
| 2008/0097923 A1 | 4/2008 | Kim et al. |
| 2008/0104679 A1 | 5/2008 | Craig |
| 2008/0109245 A1 | 5/2008 | Gupta |
| 2008/0109306 A1 | 5/2008 | Maigret et al. |
| 2008/0114755 A1 | 5/2008 | Wolters et al. |
| 2008/0116255 A1 | 5/2008 | Hilbert et al. |
| 2008/0168079 A1 | 7/2008 | Smith et al. |
| 2008/0182563 A1* | 7/2008 | Wugofski ............... G06Q 30/02 455/414.2 |
| 2008/0184135 A1* | 7/2008 | Washburn ............. G06F 16/958 715/752 |
| 2008/0184138 A1 | 7/2008 | Krzanowski et al. |
| 2008/0189254 A1 | 8/2008 | Cancel et al. |
| 2008/0208911 A1 | 8/2008 | Lee et al. |
| 2008/0222295 A1 | 9/2008 | Robinson et al. |
| 2008/0248815 A1 | 10/2008 | Busch |
| 2008/0294624 A1 | 11/2008 | Kanigsberg et al. |
| 2008/0313000 A1 | 12/2008 | Degeratu et al. |
| 2008/0319918 A1* | 12/2008 | Forlai .................... G06Q 30/02 705/80 |
| 2009/0006192 A1* | 1/2009 | Martinez ........... G06Q 30/0273 705/14.69 |
| 2009/0006371 A1 | 1/2009 | Denoue et al. |
| 2009/0006388 A1 | 1/2009 | Ives et al. |
| 2009/0012760 A1 | 1/2009 | Schunemann |
| 2009/0017804 A1 | 1/2009 | Sarukkai et al. |
| 2009/0037412 A1 | 2/2009 | Bard et al. |
| 2009/0048904 A1 | 2/2009 | Newton et al. |
| 2009/0049070 A1 | 2/2009 | Steinberg |
| 2009/0063284 A1 | 3/2009 | Turpin et al. |
| 2009/0070412 A1 | 3/2009 | D'Angelo et al. |
| 2009/0112833 A1 | 4/2009 | Marlow |
| 2009/0112841 A1 | 4/2009 | Devarakonda et al. |
| 2009/0119173 A1 | 5/2009 | Parsons et al. |
| 2009/0125420 A1 | 5/2009 | Zhang |
| 2009/0144392 A1* | 6/2009 | Wang .................... G06Q 10/10 709/217 |
| 2009/0157511 A1 | 6/2009 | Spinnell et al. |
| 2009/0164904 A1 | 6/2009 | Horowitz et al. |
| 2009/0172773 A1 | 7/2009 | Moore |
| 2009/0198487 A1 | 8/2009 | Wong et al. |
| 2009/0215469 A1 | 8/2009 | Fisher et al. |
| 2009/0216741 A1 | 8/2009 | Thrall et al. |
| 2009/0222348 A1 | 9/2009 | Ransom et al. |
| 2009/0222551 A1 | 9/2009 | Neely et al. |
| 2009/0254529 A1 | 10/2009 | Goldentouch |
| 2009/0259550 A1 | 10/2009 | Mihelich et al. |
| 2009/0265221 A1 | 10/2009 | Woods et al. |
| 2009/0319518 A1 | 12/2009 | Koudas et al. |
| 2010/0063961 A1 | 3/2010 | Guiheneuf et al. |
| 2010/0070448 A1 | 3/2010 | Omoigui |
| 2010/0070517 A1 | 3/2010 | Ghosh et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0121857 A1 | 5/2010 | Elmore et al. |
| 2010/0125563 A1 | 5/2010 | Nair et al. |
| 2010/0146144 A1 | 6/2010 | Audenaert et al. |
| 2010/0159965 A1 | 6/2010 | Pascal et al. |
| 2010/0218128 A1* | 8/2010 | Bonat ................. G06Q 30/0211 715/765 |
| 2010/0228617 A1 | 9/2010 | Ransom et al. |
| 2010/0250330 A1 | 9/2010 | Lam et al. |
| 2010/0280860 A1* | 11/2010 | Iskold .................... G06Q 50/01 705/319 |
| 2010/0306049 A1 | 12/2010 | Kakade et al. |
| 2010/0312769 A1 | 12/2010 | Bailey et al. |
| 2010/0318613 A1 | 12/2010 | Souza et al. |
| 2010/0332330 A1 | 12/2010 | Goel et al. |
| 2010/0332962 A1 | 12/2010 | Hammer et al. |
| 2011/0004692 A1 | 1/2011 | Occhino et al. |
| 2011/0047479 A1 | 2/2011 | Ghosh |
| 2011/0055017 A1 | 3/2011 | Solomon et al. |
| 2011/0066844 A1 | 3/2011 | O'Toole, Jr. |
| 2011/0078188 A1 | 3/2011 | Li et al. |
| 2011/0082858 A1 | 4/2011 | Yu et al. |
| 2011/0099070 A1 | 4/2011 | Eliason |
| 2011/0112899 A1 | 5/2011 | Strutton et al. |
| 2011/0125550 A1 | 5/2011 | Erhart et al. |
| 2011/0131504 A1 | 6/2011 | Shustef |

(56) References Cited

U.S. PATENT DOCUMENTS

| | | |
|---|---|---|
| 2011/0145064 A1 | 6/2011 | Anderson et al. |
| 2011/0153412 A1 | 6/2011 | Novikov et al. |
| 2011/0179061 A1 | 7/2011 | Chilakamarri et al. |
| 2011/0181906 A1 | 7/2011 | Grueneberg et al. |
| 2011/0191417 A1 | 8/2011 | Rathod |
| 2011/0202606 A1 | 8/2011 | Agarwal et al. |
| 2011/0213670 A1 | 9/2011 | Strutton et al. |
| 2011/0231478 A1 | 9/2011 | Wheeler et al. |
| 2011/0258560 A1 | 10/2011 | Mercuri et al. |
| 2011/0264736 A1 | 10/2011 | Zuckerberg et al. |
| 2011/0265011 A1 | 10/2011 | Taylor et al. |
| 2011/0270649 A1 | 11/2011 | Kerho |
| 2011/0282943 A1 | 11/2011 | Anderson et al. |
| 2011/0288917 A1 | 11/2011 | Wanek et al. |
| 2011/0307312 A1 | 12/2011 | Goeldi |
| 2011/0307791 A1 | 12/2011 | Pierre et al. |
| 2011/0313996 A1 | 12/2011 | Strauss et al. |
| 2011/0320542 A1 | 12/2011 | Bendel et al. |
| 2012/0036006 A1 | 2/2012 | Mauro |
| 2012/0042020 A1 | 2/2012 | Kolari et al. |
| 2012/0047011 A1 | 2/2012 | Rippetoe et al. |
| 2012/0054120 A1 | 3/2012 | Hjelm et al. |
| 2012/0109751 A1 | 5/2012 | Binenstock et al. |
| 2012/0109777 A1 | 5/2012 | Lipsitz et al. |
| 2012/0110464 A1 | 5/2012 | Chen et al. |
| 2012/0150989 A1 | 6/2012 | Portnoy et al. |
| 2012/0158476 A1 | 6/2012 | Neystadt et al. |
| 2012/0158494 A1 | 6/2012 | Reis et al. |
| 2012/0167137 A1 | 6/2012 | Wong et al. |
| 2012/0185544 A1 | 7/2012 | Chang et al. |
| 2012/0185764 A1 | 7/2012 | Ball et al. |
| 2012/0226713 A1 | 9/2012 | Park et al. |
| 2012/0233258 A1 | 9/2012 | Vijayaraghavan et al. |
| 2012/0253885 A1 | 10/2012 | Newton |
| 2012/0290431 A1 | 11/2012 | Tedjamulia et al. |
| 2012/0290432 A1 | 11/2012 | Tedjamulia et al. |
| 2013/0014137 A1 | 1/2013 | Bhatia et al. |
| 2013/0014222 A1 | 1/2013 | Bhatia et al. |
| 2013/0014223 A1 | 1/2013 | Bhatia et al. |
| 2013/0035982 A1 | 2/2013 | Zhang et al. |
| 2013/0060864 A1 | 3/2013 | Ehms et al. |
| 2013/0073378 A1 | 3/2013 | Naveh et al. |
| 2013/0080264 A1 | 3/2013 | Umeda |
| 2013/0132437 A1 | 5/2013 | Park et al. |
| 2013/0166379 A1 | 6/2013 | Ehindero et al. |
| 2013/0179217 A1 | 7/2013 | Newton |
| 2013/0291060 A1 | 10/2013 | Moore |
| 2013/0325733 A1 | 12/2013 | Wu et al. |
| 2014/0074551 A1 | 3/2014 | Setayesh et al. |
| 2014/0074844 A1 | 3/2014 | Subramanian et al. |
| 2014/0074856 A1 | 3/2014 | Rao |
| 2014/0082070 A1 | 3/2014 | Chakraborty et al. |
| 2014/0114959 A1 | 4/2014 | Sankhla et al. |
| 2014/0173641 A1 | 6/2014 | Bhatia et al. |
| 2014/0173643 A1 | 6/2014 | Bhatia et al. |
| 2014/0180788 A1 | 6/2014 | George et al. |
| 2014/0365275 A1 | 12/2014 | Newton |
| 2016/0063442 A1 | 3/2016 | Bennett et al. |

OTHER PUBLICATIONS

Bracco, Mike, To cross-post or not to cross-post . . . , from The Next Web.com, downloaded from https://thenextweb.com/2009/07/06/crosspost-crosspost/on Jul. 25, 2019, and dated Jul. 6, 2009 (Year: 2009).

Broida, Rick, Update All Your Social Networks at Once with Ping.fm, downloaded from https://www.pcworld.com/article/164893/ Update_AILYour_SociaLNetworks_at_Once_with_PingJm on Jul. 25, 2019, dated May 14, 2009 (Year: 2009).

Disappearing Content: The Future of Social Media?, from the Biztraffic Team, downloaded from https://info.biztraffic.com/blog/disappearing-content-future-of-social-media on Jul. 26, 2019, dated Mar. 23, 2017 (Year: 2017).

Gallagher, Christine, Using Posterous as a Social Time Saver, from She's got Clients, downloaded from https://shesgotclients.com/social-media/posterous-social-time-saver/on Jul. 25, 2019, dated Jul. 26, 2009 (Year: 2009).

Machlis, Sharon, Hands on: Posterous simplifies posting to multiple online services, from Network World, downloaded from https://www.networkworld.com/article/2259539/hands-on-posterous-simplifies-posting-to-multiple-online-services.html on Jul. 25, 2019, dated Jul. 10, 2009 (Year: 2009).

Onnela, J.P., et al., Analysis of a large-scale weighted network of one-to-one human communication, New Journal of Physics, 2007, downloaded from https://iopscience.iop.org/article/10.1088/1367-2630/9/6/179/pdfon Jul. 24, 2019 (Year: 2007).

Onnela, J.P., etal., Structure and tie strengths in mobile communications networks, PNAS, vol. 104, No. 18, pp. 7332-7336, dated May 1, 2007, downloaded from https://www.pnas.org/content/pnas/104/18/7332.full.pdfon Jul. 24, 2019 (Year: 2007).

Quora—Where did the saying "it's not what you know, it's who you know" originate?, downloaded from https://www.quora.com/Where-did-the-saying-its-not-what-you-know-but-who-you-know-originate on Jul. 26, 2019 (Year: 2011).

W3C homepage screenshot, from http://www.w3.org, taken Jul. 25, 2019 (Year: 2019).

Towards a New Multimedia Paradigm, Hoogeveen, ED-Media 95 Proceedings. 2005.

Sullivan, Danny, URL Shorteners: Which Shortening Service Should You Use?, at SearchEngineLand.com, downloaded from https://web.archive.org/web/20090405074950/http://searchengineland.com/analysis-which-url-shortening-service-should-you-use-17204 on Jul. 4, 2016, dated Apr. 4, 2009, Archived on Apr. 5, 2009.

ShortURL.com, author unknown, downloaded from http://www.shorturl.com on Jul. 4, 2016 (hereinafter ShortURL screenshot).

Short Message Service, from Wikipedia, downloaded from https://en.wikipedia.org/wiki/Short Message Service on Jan. 25, 2016.

Purdy, Kevin, Make Your Own URL Shortening Service, at lifehacker.com, downloaded from http://lifehacker.com/5335216/make-your-own-url-shortening-service on Jul. 4, 2016 and dated Aug. 14, 2009.

Ningthoujam, Palin, URL Toolbox: 90+ URL Shortening Services, from Mashable, downloaded from http://mashable.com/2008/02/01/url-shortening-services/ on Jul. 5, 2016, dated Jan. 8, 2008.

Meta refresh, from Wikipedia, dated Jan. 16, 2006, downloaded Jul. 5, 2016 from https://en.wikipedia.org/w/index php?title=Meta_refresh&oldid=35429258.

McNay; Enterprise content management: an overview; Published in: Professional Communication Conference, 2002. IPCC 2002. Proceedings. IEEE International; Date of Conference: 2002; pp. 396-402; IEEE Xplore.

Koskinen; Social software for industrial interaction; Published in: Proceeding OZCHI '06 Proceedings of the 18th Australia conference on Computer-Human Interaction: Design: Activities, Artefacts and Environments; 2006; pp. 381-384; ACM Digital Library.

Justin Perkins, Is It Worth It? An ROI Calculator for Social Network Campaigns, Jul. 24, 2007, pp. 1-17, http://frogloop.com/social-network-calculator.

HTML, from Wikipedia, downloaded from https://en.wikipedia.org/w/index.php?title=HTML&oldid=410415700 on May 10, 2016, and dated Jan. 27, 2011.

How to Write Advertisements that Sell, author unknown, from System, the magazine of Business, dated 1912, downloaded from http://library.duke.edu/digitalcollections/eaa_Q0050/ on Feb. 21, 2015.

History of OOH, downloaded from http://www.oaaa.0rg/OutofHomeAdvertising/HistoryofOOH.aspx# on Mar. 13, 2015.

Damien, "The Howto Guide to Add Facebook Social Plugins to Your WordPress Site", Apr. 28, 2010, from maketecheasier (downloaded Mar. 28, 2015 from http://www.maketecheasier.com/howto-guide-to-add-facebook-social-plugin-to-your-site/).

Christina Warren, How To: Measure Social Media ROI, Oct. 27, 2009, pp. 4-24. http://mashable.com/2009/10/27/social-media-roi/.

Butler, Christopher, A Practical Guide to Social Media, dated May 28, 2009 and published by Newfangled.com, downloaded from https://www.newfangled.com/a-practical-guide-to-social-media/ on Jan. 26, 2016 (hereinafter Butler).

(56) References Cited

OTHER PUBLICATIONS

Advertising agency, from Wikipedia, downloaded from https://en.wikipedia.org/wiki/Advertising_agency on Jan. 21, 2016.
20 Really Short URL Shorteners, by Webmasterish, at SingleFunction.com, downloaded from http://singlefunction.com/20-really- short-url-shorteners/ on Jul. 4, 2016 and dated Mar. 4, 2009.
Galindo, Luis Angel, et al., The Social Network Behind Telecom Networks, downloaded from http://www.w3.org/2008/09/msnws/papers/telefonica-business-operator.pdf on Aug. 30, 2018 (Year 2009).
H76: Using meta refresh to create an instant client-side redirect, which is at p. 140 of Techniques for WCAG 2.0 above, downloaded Apr. 3, 2021 from https://www.w3.org/WAI/GL/WCAG20/WD-WCAG20-TECHS-20071102/complete.html#H76 (Year:2007).
MacArthur, Amanda, The Real History of Twitter, in Brief, downloaded from https://www.lifewire.com/history-of-twitter-3288854 on Apr. 5, 2021 (Year: 2021).
Merriam Webster Dictionary, definition of "social media", downloaded from https://www.merriam-webster.com/dictionary/social%20media on Apr. 6, 2021 (Year: 2021).
Sagolla, Dorn, How Twitter Was Born, dated Jan. 30, 2009, downloaded from http://www.140characters.com/2009/01/30/how-twitter-was-born/ on Apr. 5, 2021 (Year: 2021).
Social media, from Wikipedia, datad Aug. 17, 2009, downloaded Apr. 6, 2021 from https://en.wikipedia.0rg/w/index.php7title=Social_media&oldid=308508024 (Year:2009).
Techniques for WCAG 2.0, downloaded Apr. 3, 2021 from https://www.w3.org/WAI/GL7WCAG20/WD-WCAG20-TECHS-20071102/ complete.html#H76 (Year: 2007).
Twitter, written by The Editors of Encylopaedia Britannica, downloaded from https://www.britannica.com/topic/Twitter on Apr. 5, 2021 (Year: 2021).
Gray, Michael, 5 Microblogging Sites That Aren't Twitter, dated Aug. 11, 2009, downloaded May 12, 2022 from https://searchengineland.com/5-microblogging-sites-that-arent-twitter-23481 (Year: 2009).

\* cited by examiner

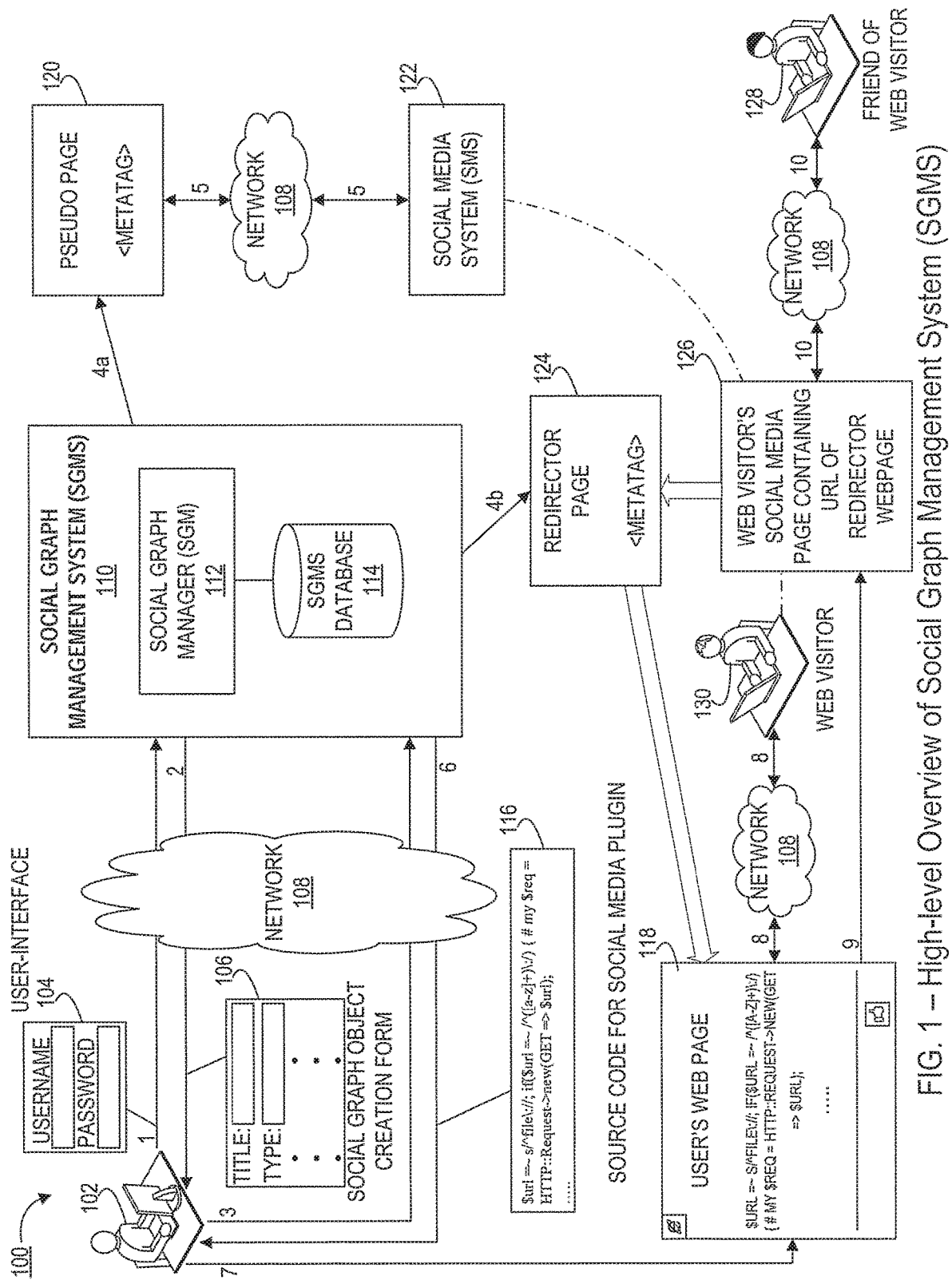
FIG. 1 – High-level Overview of Social Graph Management System (SGMS)

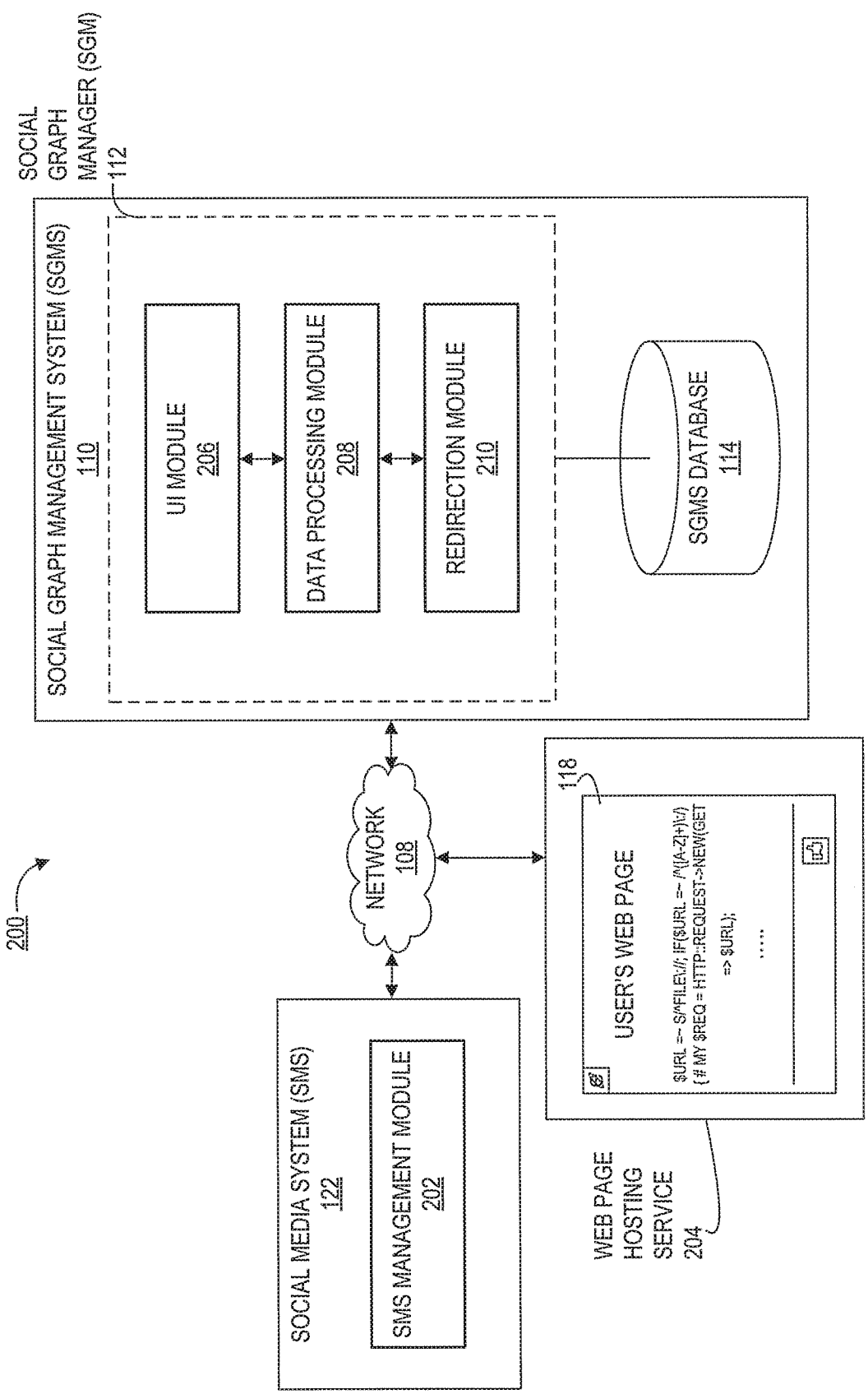
FIG. 2 – Exemplary SGMS Architecture

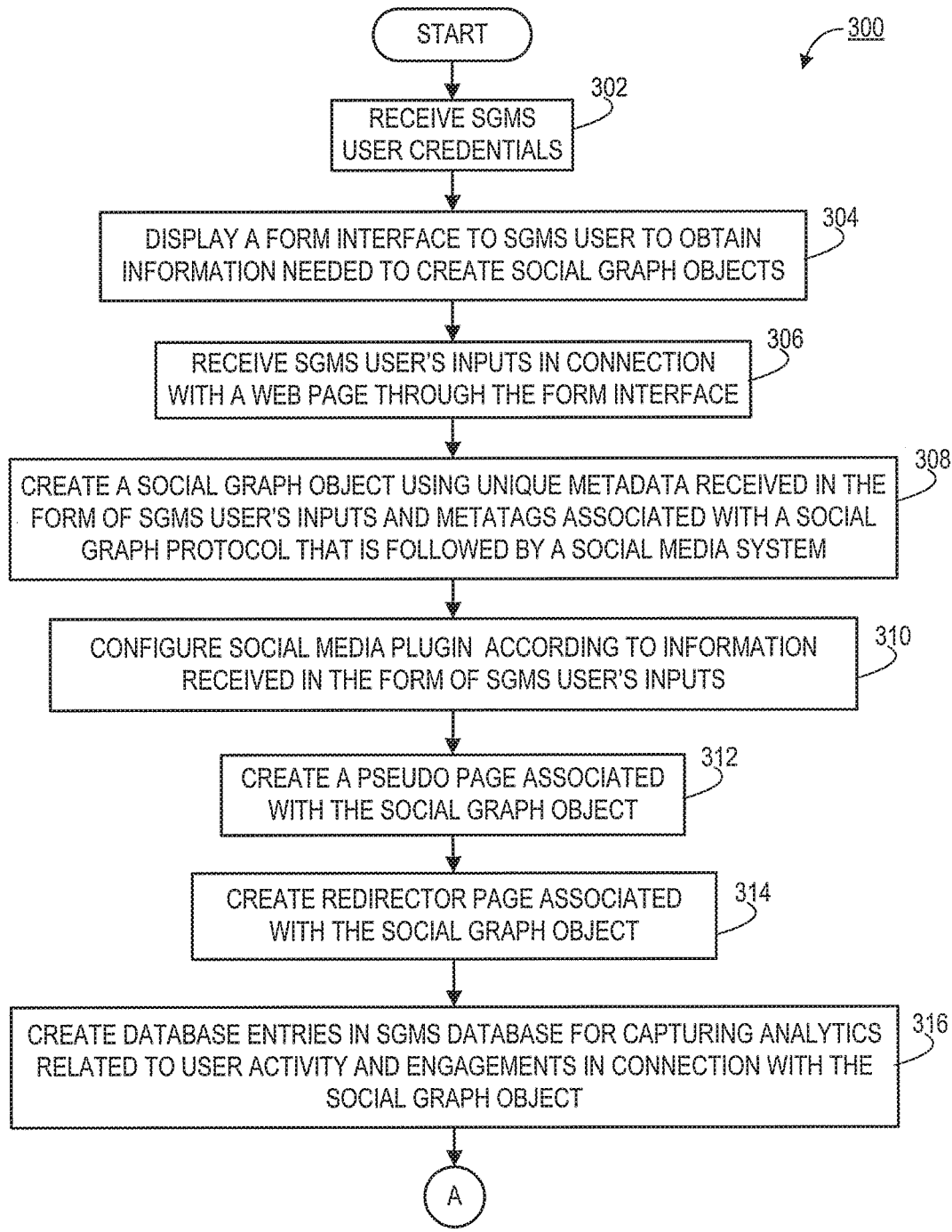
FIG. 3A – Exemplary Social Graph Object Creation and Management Process

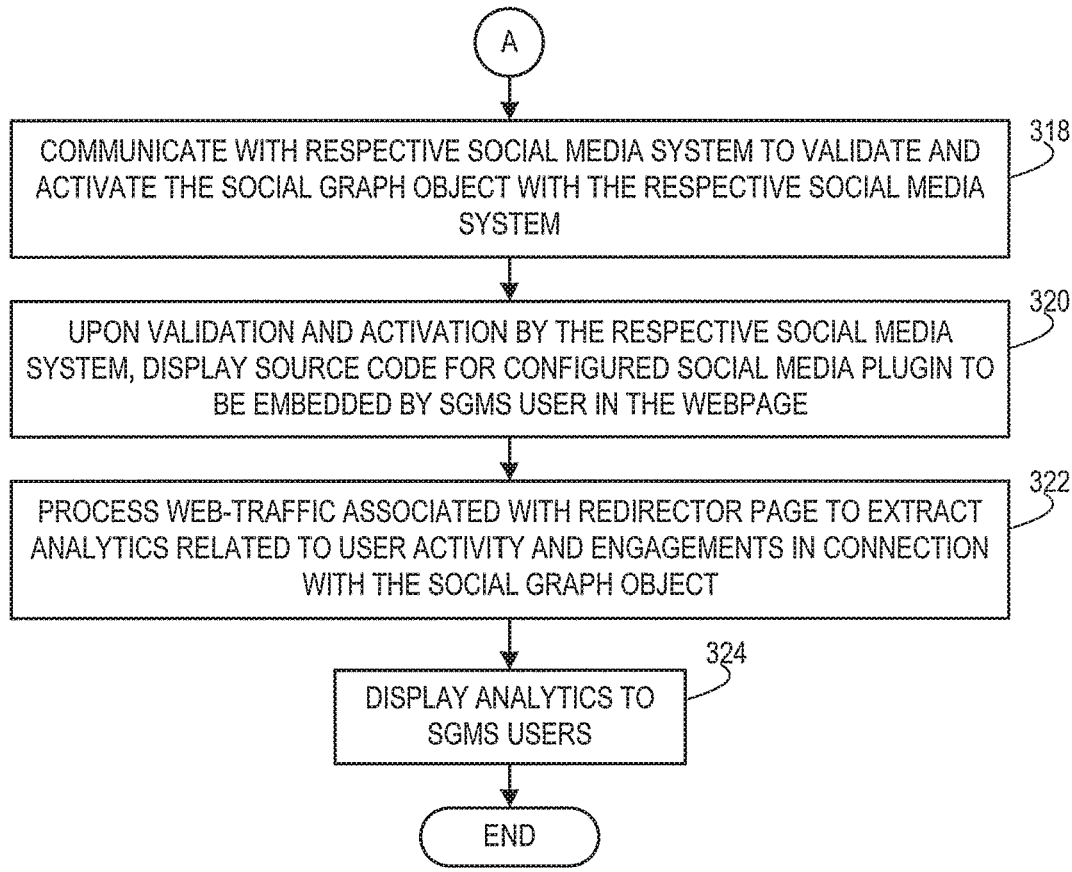
FIG. 3B – Exemplary Social Graph Object Creation and Management Process

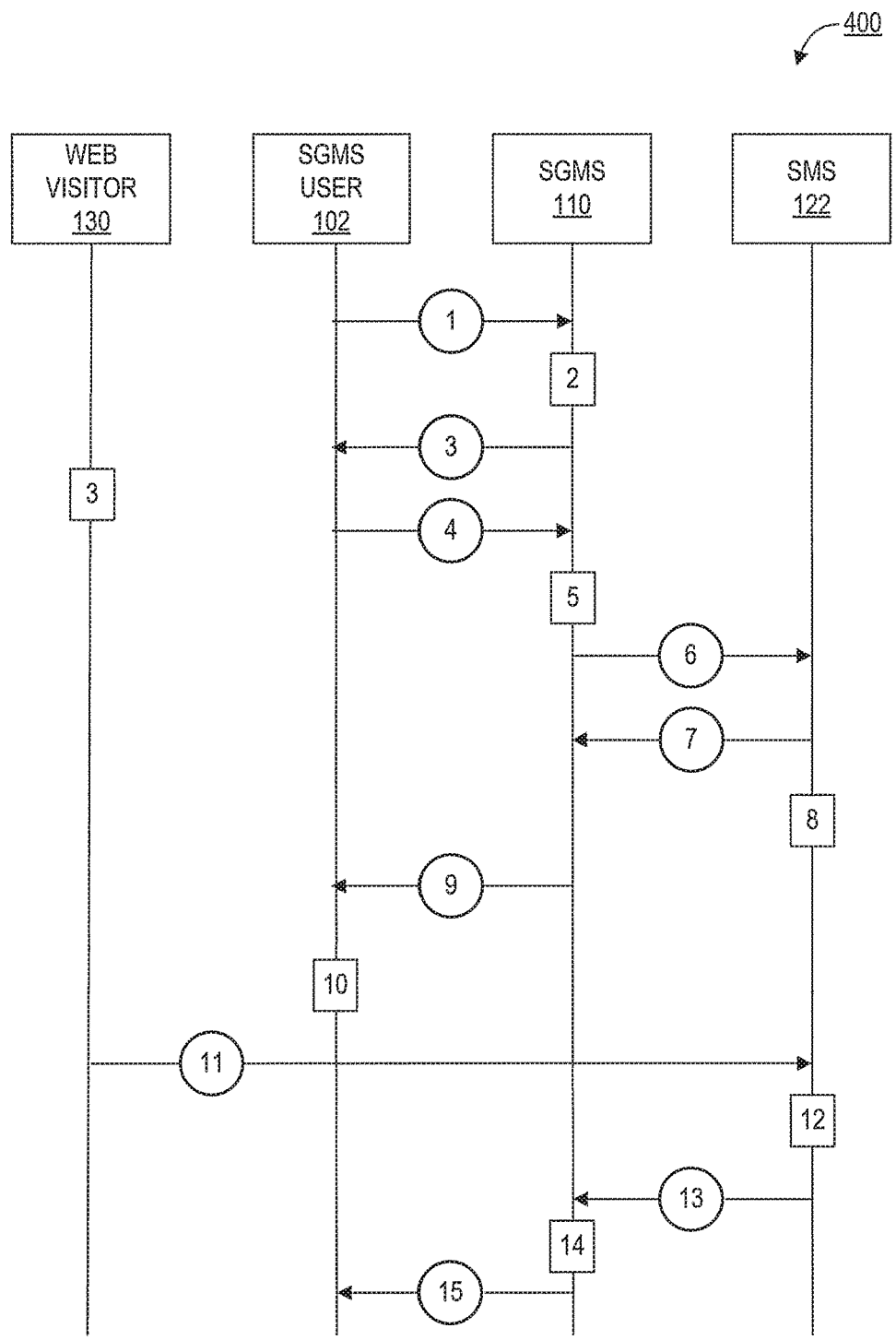
FIG. 4 – Exemplary Sequence Diagram Showing Interactions Between Various System Components

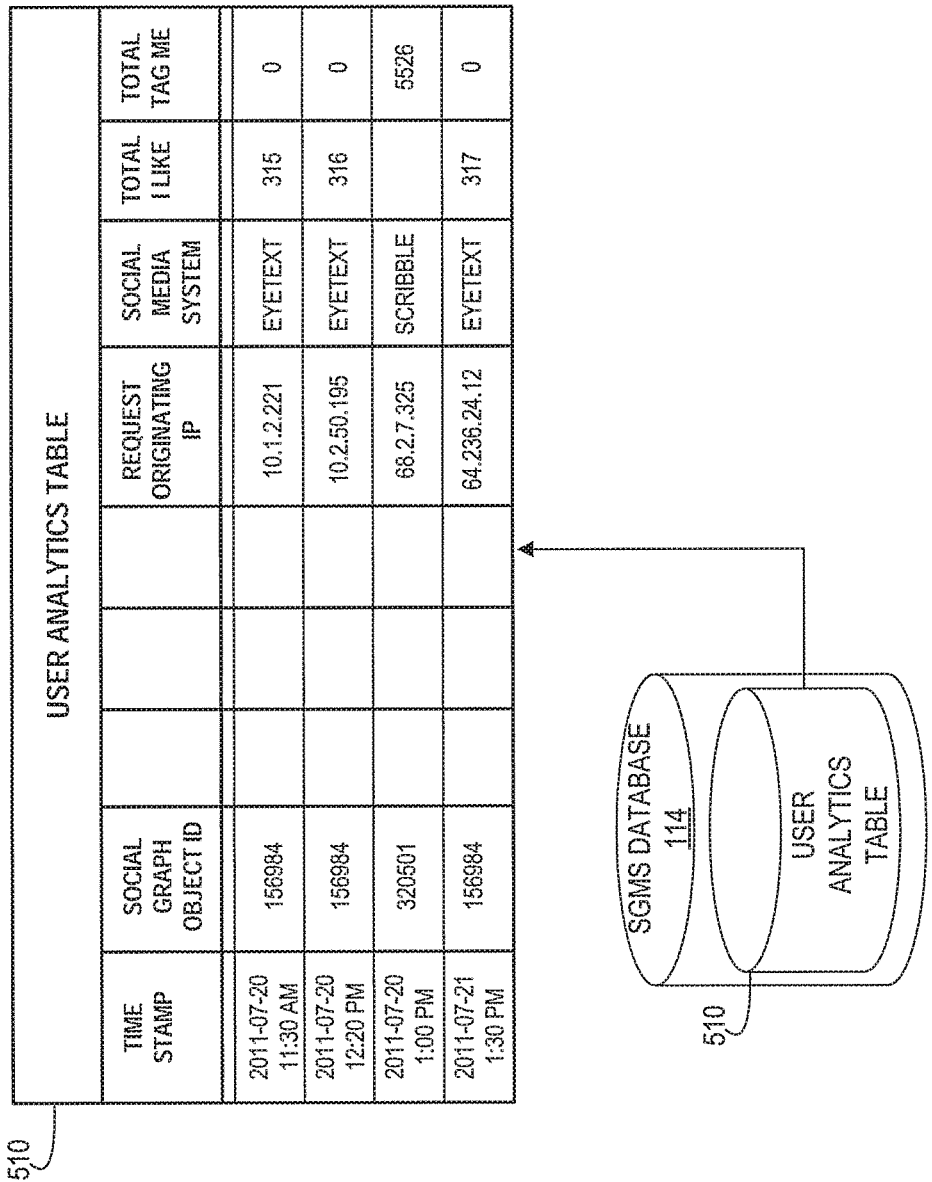
FIG. 5 – Exemplary SGMS Database Comprising Social Graph Object Data

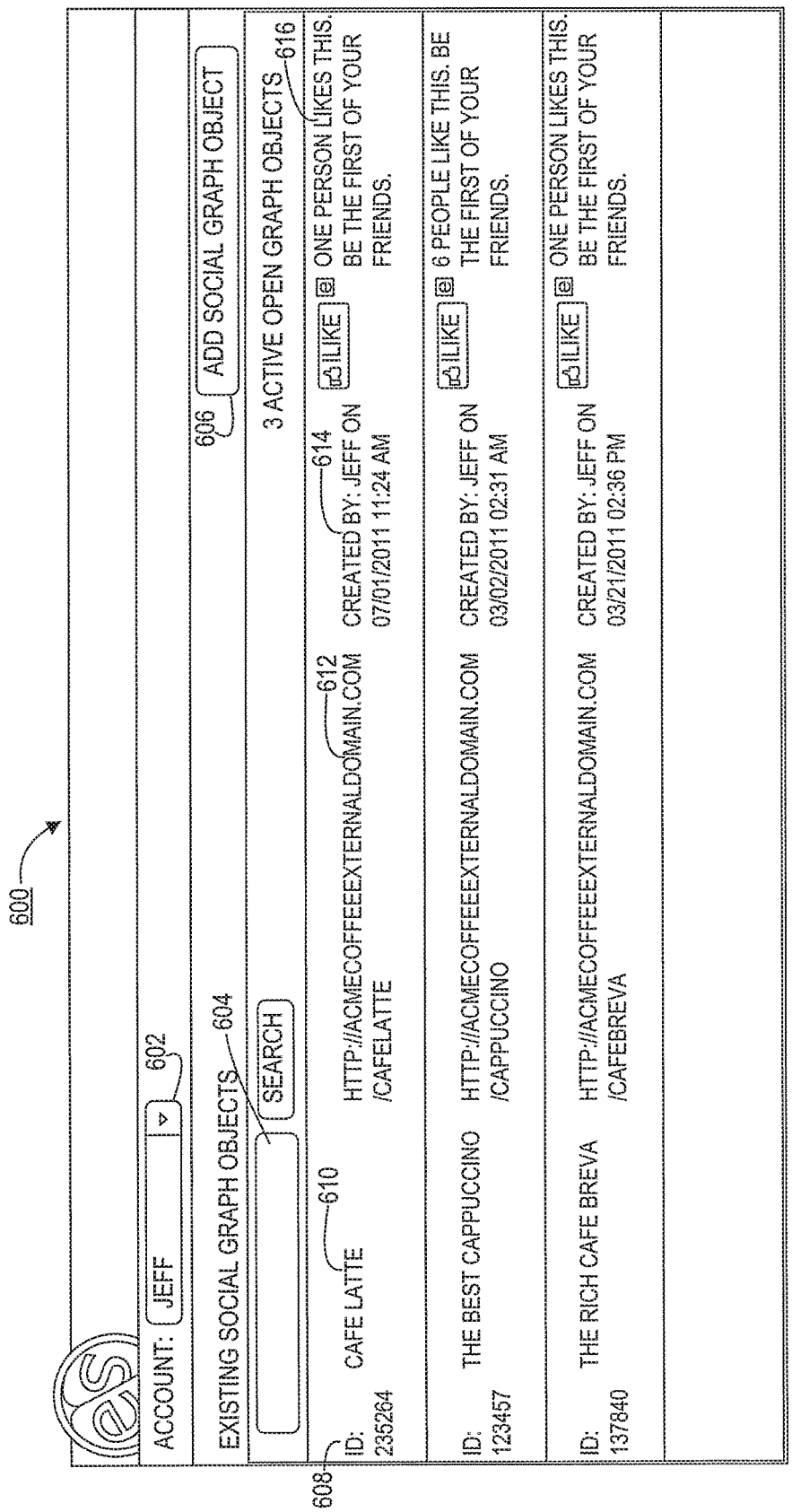
FIG. 6 – Exemplary SGMS Interface Showing Pre-Created Social Graph Objects

FIG. 7 – Exemplary SGMS Interface for Creating Social Graph Objects

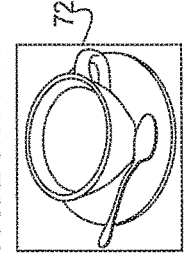
FIG. 8 – Exemplary SGMS Interface Displaying Source Code for Social Media Plugin

| ACCOUNT: | JEFF ▽ | — 602 | | | 606 — ADD SOCIAL GRAPH OBJECT |
|---|---|---|---|---|---|
| EXISTING SOCIAL GRAPH OBJECTS — 604 | | | | | |
| | SEARCH | | | | 4 ACTIVE SOCIAL GRAPH OBJECTS — 616 |
| 608 — | 610 — HOW TO MAKE THE PERFECT BREW COFFEE | HTTP://ACMECOFFEEEXTERNALDOMAIN.COM /PERFECTBREW | — 612 | CREATED BY: JEFF ON 07/07/2011 10:24 AM — 614 | 👍 iLIKE 回 BE THE FIRST OF YOUR FRIENDS TO LIKE THIS. — 918 |
| ID: 240244 | | | | | |
| ID: 235264 | CAFE LATTE | HTTP://ACMECOFFEEEXTERNALDOMAIN.COM /CAFELATTE | | CREATED BY: JEFF ON 07/01/2011 11:24 AM | 👍 iLIKE 回 ONE PERSON LIKES THIS. BE THE FIRST OF YOUR FRIENDS. |
| ID: 123457 | THE BEST CAPPUCCINO | HTTP://ACMECOFFEEEXTERNALDOMAIN.COM /CAPPUCCINO | | CREATED BY: JEFF ON 03/02/2011 02:31 AM | 👍 iLIKE 回 6 PEOPLE LIKE THIS. BE THE FIRST OF YOUR FRIENDS. |
| ID: 137840 | THE RICH CAFE BREVA | HTTP://ACMECOFFEEEXTERNALDOMAIN.COM /CAFEBREVA | | CREATED BY: JEFF ON 03/21/2011 02:36 PM | 👍 iLIKE 回 ONE PERSON LIKES THIS. BE THE FIRST OF YOUR FRIENDS. |

900

FIG. 9 – Exemplary SGMS Interface Showing Pre-created Social Graph Objects

1000A

ACME COFFEE

[HOME] [OUR COFFEES] [COFFEE ABC] [THE ACME COFFEE PLAN] [COFFEE AND WELL-BEING] [MY ACME COFFEE]

ALL YOU WANT TO KNOW ABOUT COFFEE

PRESENTED BY ACMECOFFEE

FEATURED ARTICLES:

COFFEE TASTING

COFFEE TASTING (ALSO CALLED COFFEE CUPPING) IS DONE TO DETERMINE THE CHARACTERISTICS OF A PARTICULAR COFFEE BLEND. A COFFEE TASTER JUDGES COFFEE BASED ON APPEARANCE, AROMA, BODY, AND FLAVOUR BY FIRST SMELLING AND THEN TASTING THE COFFEE.

READ MORE >

COFFEE ORIGINS

AS THE LEGEND GOES, THE FIRST PERSON TO EVER DRINK A CUP OF COFFEE WAS THE 9TH CENTURY GOAT HERDER KALDI WHO NOTICED THAT HIS FLOCK HAD MORE ENERGY WHEN CONSUMING THE RED BERRIES OF A CERTAIN PLANT. HE COLLECTED THE BERRIES AND TOOK THEM TO A MUSLIM HOLY MAN WHO THREW THEM INTO A FIRE.

READ MORE >

FAST FACTS:

v ARABICA AND ROBUSTA

THE 2 MAIN TYPES OF COMMERCIALLY GROWN COFFEE ARE ARABICA AND ROBUSTA. ARABICA BEANS ACCOUNT FOR AROUND 65% OF TOTAL COFFEE PRODUCTION, ROBUSTA MAKE UP THE REST.

> ONE OF MOST CONSUMED BEVERAGES

1006

TERMS AND CONDITIONS | PRIVACY POLICY | CONTACT US

FIG. 10A – Exemplary Web Page Before Association with Social Media Systems

FIG. 10B – Exemplary Web Page After Association with Social Media Systems

SYSTEMS AND METHODS FOR ASSOCIATING SOCIAL MEDIA SYSTEMS AND WEB PAGES

INCORPORATION BY REFERENCE; DISCLAIMER

Each of the following applications are hereby incorporated by reference: application Ser. No. 13/195,677 filed on Aug. 1, 2011; application Ser. No. 12/859,675 filed on Aug. 19, 2010; application No. 61/235,277 filed on Aug. 19, 2009; application No. 61/369,560 filed Jul. 30, 2010. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure elates generally to the creation and management of associations between social media systems and web pages. In particular, aspects of the present disclosure relate to an intermediary system that induces greater flexibility in streamlining the creation and management of electronic associations between social graphs (which are generated due to complex interconnections arising from published content on social media pages of individuals, organizations, and corporate entities and hosted by social media systems) and web pages, wherein such electronic associations promote greater interactions between web page visitors and users of social media pages.

BACKGROUND

Establishing a well-rounded social media presence is important for many organizations, corporate entities and private individuals. Social media pages belonging to private individuals generally provide an online description of a page owner's socio-cultural profile including a page owner's friends, family, hometown, birthday, relationship status, political views, fans, interests, hobbies, likes, dislikes, and many more such attributes. Social media pages further provide a page owner's socio-economic status, educational background, professional qualifications and expertise, various networks, ventures and organizations a page owner is affiliated with, career opportunities a page owner is involved in, and several others. Social media pages belonging to organizations and corporate entities provide information relating to their businesses, business ethics, human rights, diversity in their workplace, sustainability considerations undertaken, charities supported, donations, endorsements, upcoming events, and various other parameters that impact society. In recent times, social media pages belonging to individuals, political parties, and non-profit institutions disseminate mass information about social and political uprisings and wrongdoings in restrictive and undemocratic territories and countries.

Social media pages of private individuals, organizations and corporate entities are typically hosted by social media systems, also referred to as social media networks. Common examples of social media systems include YOUTUBE™, FACEBOOK™, TWITTER™, LINKEDIN™, MY SPACE™, GOOGLE BUZZ™, and many more. Further, examples of social media systems include social bookmarking sites like Del.icio.us™, and social news sites like DIGG™ and REDDIT™. Social media pages generally comprise web pages hosted by a social media system and can be accessed via computers, smart phones or any other Internet-enabled computing device.

Users of social media systems own one or more social media pages that are used as a platform to interact, exchange and engage with other users and even, in some cases, with individuals who do not own social media pages. Social media pages are personal or group pages that disseminate information through messages, files, posts, news feeds, photographs, audio clips, video clips, URL's, etc. Information shared on social media pages involve associations through personal and business contacts, for example, including friends, family, classmates, co-workers, customers, political constituents, clients, and various social groups/organizations on a social media system. This extensive set of relationships generates a vast database of interconnections involving social media system users which can be mapped into social graphs by social media systems. Thus, a user's social graph is a complex digital footprint of all such relationships wherein owners of social media pages constitute the nodes of the social graph. As will be understood by one skilled in the art, owners of a social media page can belong to more than one social graph, and hence social graphs are overlapping in nature. Because of the complexities of interconnections in social graphs, social graphs are generally rendered on a computer with special application software.

As a result of such interconnections involving personal and business relationships, many individuals, organizations, groups, corporate entities and communities are empowered with potential marketing tools relating to their products or services. Consequently, a large number of marketing campaigns are launched via social media pages, different from conventional marketing campaigns involving radio, television, print, and traditional online ads that are not dependent on social media systems.

In advertising and marketing campaigns launched via social media pages, advertisers and marketers post messages or advertisements on social media pages belonging to an individual, an organization, corporate entity, or in some scenarios, on a social media page that is owned by a common interest group or channel. Individuals review such messages or advertisements, generally termed posts, along with accompanying files, news feeds, photographs, audio clips, video clips, coupons, polls, quizzes, URLs (Uniform Resource Locators), etc. It will be understood by one of ordinary skill in the art that use of such a wide variety of multimedia tools and features promotes rich, interactive, and personalized social media experiences and manifests by driving web traffic to a social media page belonging to a social media page owner.

Recently, in addition to direct advertising and marketing campaigns launched via social media pages, social graphs (as explained earlier) created by social media systems, when linked with traditional web pages, have been found to significantly change the ways in which people find, research, purchase, and support products. For example, if a person buys a product from a merchant via the merchant's traditional web page, wherein the merchant's web page is linked with a social media system, then such a linkage facilitates sharing of information related to the purchase with friends and fans of the person on the social media system. This is possible generally because social media systems provide various tools that facilitate associations between conventional web pages and social media pages. Generally speaking, these tools create linkages that provide a channel of communication between web pages and social media pages. Such tools are usually referred to as "social media plugins"

in the art, and are inserted in web pages (including blogs or video blogs) of individuals, organization, and corporate entities. As will be understood and appreciated, social media plugins provided by social media systems can be inserted into web pages, and hence allow integration of interactive features of social media systems on web pages, and also allows communication between social media profile pages and web pages.

As a result of the above features, it will be understood that social media plugins are useful tools for web page owners in driving web traffic to their web pages, consequently realizing greater credibility and popularity of their web pages. For instance, owners of web pages can insert on their web pages a social media plugin called the "Like" button provided by the social media system FACEBOOK™. The Like button on a web page or a social media page displays the number of times certain content on the web page or the social media page has been appreciated ("liked") by FACEBOOK™ users. The Like button also allows visitors who visit the web page to publish a message comprising related content and provides a link to the web page on the visitor's FACEBOOK™ profile page. Friends and fans of the visitor on FACEBOOK™ can review the message on the visitor's FACEBOOK™ profile page, and further, upon clicking a link attached to the message they will be directed to the web page. Such a functionality is also provided by social bookmarking sites and social news sites such as Del.icio.us™ and DIGG™.

In some scenarios, a web page requires visitors of the web page to create a user account on the web page for interacting or interfacing with the web page. Examples of such web pages include those owned by online merchants, retailers, news and sports blogs, non-profit organizations and various others. In these scenarios, social media plugins inserted in such web pages and developed by social media systems provides visitors (who are also users of social media pages) the benefit of interacting with the web pages without the need to create a user account or even log in, if the visitors are already logged into their respective social media systems. An example of such a social media plugin is the "Facebook Connect" button provided by FACEBOOK™.

In another scenario, social media plugins for example, the Activity Feed box), provided by social media systems (for example, FACEBOOK™) informs a visitor about recent (and even real time) activities on a web page involving friends of the visitor, wherein the visitor as well as the visitor's friends have social media profile pages. Thus, as can be understood and appreciated, social media plugins generally provide various analytics related to user activity and engagement of visitors of web pages with the web pages themselves, which are key to analyze the effectiveness of published content on web pages.

Despite the aforementioned benefits provided by social media plugins, it will be understood that the process of configuring social media plugins before insertion into a web page can be quite complicated and even cumbersome, depending on the social media plugin and the associated social media system. Moreover, a diverse variety of social media plugins (for example, Like button of FACEBOOK™, Activity Feed box of FACEBOOK™, Share button of LINKEDIN™, Tweet button of TWITTER™, to name a few) each differing in their features and configuration processes, creates an overwhelming multitude of options for owners of web pages.

Unfortunately, and as will be known to one of ordinary skill, in many scenarios, web pages and systems associated with them often crash (break down) unexpectedly. In many other scenarios, content on a web page needs to be updated regularly (or sometimes sporadically), e.g., the title of an organization's web page has to be changed to reflect the organization's new products, etc. In a related scenario, a web page hosting service provider may need to be changed for convenience or financial reasons, or further, the servers that host a web page might unexpectedly crash due to unforeseen circumstances. Unfortunately, in such scenarios, associations (linkages) created between the web page and social media systems are broken, and sometimes even lost. This generally causes social media systems to restart the process of collecting analytics in connection with user activity and engagement of visitors related to the web page, from the beginning, treating the web page as a new page. This is highly undesirable as this causes frustration to users of social media pages who are affected due to the broken associations, and possibly loss of customers for businesses that use web pages and associated social media pages to attract customers and transact business.

Consequently, there is a long-felt but unresolved need for consolidated systems and methods that facilitate flexible yet robust associations between web pages and social media pages. In other words, such associations needs to be flexible in the event of updates to the web page or changes of web page hosting services, and yet robust to failures of the web page or the related hosting services. Even further, it would be desirable to have a system that does not involve complicated configurations by web page owners; rather, the system should provide an easy-to-use interface for persons of ordinary technical knowledge to streamline the task of creating and managing associations between web pages and social media pages, without the need for installing additional software. Moreover, the system should also provide (preferably customized) detailed analytics related to user activity and engagement of visitors related to the web page.

BRIEF SUMMARY OF THE DISCLOSURE

Briefly described, and according too one embodiment, aspects of the present disclosure generally relate to systems and methods creating and managing associations between social media systems and web pages, using an embodiment of the social graph management system (SGMS) disclosed herein. In one embodiment, aspects of the present disclosure relate to an improved system or method for creating social graph objects within traditional web pages, and subsequently maintaining and managing the social graph objects and related information. According to yet another embodiment, aspects of the present disclosure relate to systems and methods for inserting social media plugins into web pages, and managing the use of, user interaction with, and information relating to the inserted social media plugins. In yet another embodiment, aspects of the present disclosure relate to systems and methods for creating and managing associations between social graphs (generated due to the interactions between individuals, organizations, and corporate entities on social media systems) and web pages owned by individuals, organizations and corporate entities.

It will be understood and appreciated that according to one embodiment, SGMS users who wish to create and manage associations between a web page and social media pages access the SGMS easily via an user interface over a computer network, such as the World Wide Web (WWW) or Internet, using varying types of electronic devices such as smart phones and computers. In one embodiment, the SGMS receives information (such as a title, URL, and various other attributes) from SGMS users via an electronic user interface for purposes of creating intermediary page(s) that facilitate associations between social media pages and web pages, wherein in one embodiment, the intermediary page(s) function to direct traffic between social media pages and web pages. Further, the SGMS communicates via a network connection a request for activation of the intermediary page(s) to a respective social media system. Additionally, aspects of the present disclosure involve collection of analytics related to user activity from the intermediary page(s) for purposes of tracking user activity and interactions between the web page and persons visiting the web page.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIG. 1 illustrates an overview of an embodiment of a Social Graph Management System (SGMS) for creating and managing the associations between social media systems and traditional web pages, operating in an exemplary environment.

FIG. 2 shows an exemplary SGMS architecture comprising various databases, software modules, engines, and other similar elements, according to one embodiment of the present system.

FIG. 3 consisting of FIG. 3A and FIG. 3B illustrates a flowchart showing computer-implemented method steps included in an exemplary SGMS process involving various software modules and engines of the SGMS, according to one embodiment of the present system.

FIG. 4 is an exemplary sequence diagram illustrating interactions involving an embodiment of the SGMS and various other associated components operating in an exemplary environment.

FIG. 5 shows an exemplary SGMS datatable storing information and analytics related to user activity and interactions arising out of associations between social media pages and web pages, used in connection with one embodiment of the present system.

FIG. 6 is a screenshot of an exemplary SGMS interface showing various social graph objects that facilitate associations between web pages and social media systems, pre-stored in the SGMS database, according to one embodiment of the present system.

FIG. 7 is a screenshot of an exemplary SGMS interface used in creating social graph objects that facilitate associations between web pages and social media systems, using information provided by a user, according to one embodiment of the present system.

FIG. 8 is a screenshot of an exemplary SGMS interface displaying source code of a configured social media plugin to be inserted in a web page, wherein the configuration is performed on the basis of information provided by a user, according to one embodiment of the present system.

FIG. 9 is a screenshot of an exemplary SGMS interface showing a listing of social graph objects that facilitate associations between web pages and social media pages, pre-stored in the SGMS database, (including listing of a social graph object newly created according to exemplary data as shown in FIG. 7) according to one embodiment of the present system.

FIG. 10 consisting of FIG. 10A and FIG. 10B displays screenshots of an exemplary web page before and after creating associations between the web page and social media systems, according to one embodiment of the present system.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Aspects of the present disclosure relate to systems and methods for creating and managing associations between social media systems (including social media pages or accounts) and traditional web pages. In one embodiment, aspects of the present disclosure relate to an improved system or method for creating social graph objects within traditional web pages, and subsequently maintaining and managing the social graph objects and related information. According to yet another embodiment, aspects of the present disclosure relate to systems and methods for inserting social media plugins into web pages, and managing the use of, user interaction with, and information relating to the inserted social media plugins. In yet another embodiment, aspects of the present disclosure relate to systems and methods for creating and managing associations between social graphs (generated due to the interactions between individuals, organizations, and corporate entities on social media systems) and web pages owned by individuals, organizations and corporate entities. Social graphs are complex digital footprints of all such interactions, wherein owners of social media pages constitute the nodes of the social graph. As will be understood by one skilled in the art, owners of a social media page can belong to more than one social graph, and hence social graphs are overlapping in nature. Because of the complexities of interconnections in social graphs, social graphs are generally rendered on a computer with specialized application software.

Generally, as will be understood, aspects of a social graph protocol enables web pages to be associated with social media profile pages of users on a social media system. As will be understood and appreciated further from the discussions that follow, such associations will provide web page owners simple, easy-to-use tools in driving web traffic to their web pages, consequently realizing greater credibility and popularity of their web pages due to greater interactions between web visitors and users of social media pages.

As mentioned above, one aspect of the present disclosure is an improved system that enables efficient and streamlined creation and insertion of social media plugins into conventional web pages, and further enables enhanced management of the plugins and information relating thereto after insertion. As described in greater detail below, a "social graph object" generally refers to a data structure developed according to a social graph protocol that is a computer programming protocol followed by a social media system, and that includes a social media plugin. For example, data relating to an article posted on a news web page could be associated with a social media plugin, and the overall collection of data corresponding to the article and the social media plugin would comprise the social graph object for that article. Traditionally, creating and inserting social graph objects into traditional web pages was somewhat cumbersome, and could be difficult to maintain. For example, if the traditional web page were updated, or information within that web page revised, then the corresponding (and previously-inserted) social graph object could be lost, or re-set, and valuable information relating to that social graph object could be lost (e.g., the number of social media system users that had "Liked" that object could be re-set). Accordingly, the present systems and methods provide streamline mechanisms for creating and using social media plugins (and, consequently, social graph objects) in traditional web pages, and also tracking and utilizing information that is derived from such social media pages.

Referring now to the figures, FIG. 1 illustrates an overview 100 of an embodiment of a social graph management system (SGMS) 110 in an exemplary environment, constructed and operated in accordance with various aspects of the present disclosure, wherein the SGMS 110 is hosted on a physical server in a facility or a virtual server in a cloud computing environment. According to the disclosed embodiment, a SGMS user 102 utilizes the SGMS 1110 (comprising a social graph manager (SGM) 112 and a SGMS database 114), for purposes of creating and managing associations between a web page 118 and social media pages 126 on social media systems 122. Social media pages 126 can belong to one or more web visitors 130 who visit the web page 118, or can belong to friends 128 of the web visitor 130. Even further, in another aspect, social media pages 126 can also belong to the SGMS user 102. It will be further understood that the SGMS 110, in one embodiment, is used to create and manage associations between a plurality of web pages 118 (visited by a multitude of web visitors 130) and social media pages 126 belonging to web visitors 130 and/or their friends 128 on a variety of social media systems 122.

Generally speaking, and as will be understood by a person skilled in the art, a social media page is a web page that is hosted by a social media system on the world wide web (Internet). However, in the present disclosure, it will be understood that references to "web pages" or "traditional web pages" are meant to generally indicate web pages that are maintained outside of social media systems. For example, a company may maintain its traditional corporate web page, which provides information about the company, store locations, advertisements and offers, and the like, and the company may also maintain one or more social media pages within social media systems that provide interconnectivity and information-sharing features not typically offered with conventional web pages. As will also be understood and appreciated, in some embodiments, the term "social media page" does not necessarily refer to a "page," but could also refer to an account or other information-sharing tool used to connect with others in a social media system TWITTER™ feeds).

As shown in FIG. 1, computers (e.g., laptops, desktops, severs, tablet computers, etc.) or computing devices (e.g., smart phones) capable of accessing the world wide web can be used to communicate with social media pages for purposes of publishing new material, editing material, or reviewing published material. As will be known by one of ordinary skill, owners of social media pages may create a personal or group profile page and use it as a platform to share information through messages, files, posts, news feeds, photographs, audio clips, video clips, URL's, etc. As will be understood by one skilled in the art, users of social media systems 122 can access their own social media pages, and can also access and interact with social media pages owned or related to their friends 128 on social media systems 122.

Further, those skilled in the art will also understand that social media systems and the social media pages hosted therein also present marketers and advertisers affiliated with organizations, groups, and entities with potential marketing tools to advertise their products and/or services. In other words, marketers and advertisers can post messages or advertisements on these social media systems as a way to advertise outside of conventional marketing channels such as radio, television, print, and conventional web pages. Such messages or advertisements can include polls, quizzes, video clips, coupons, and various other multimedia tools and features. Details of such a system wherein marketers and advertisers are able to post messages and/or advertisements on social media profile pages of users of a social media page is discussed in greater detail in U.S. patent application Ser. No. 12/859,675, filed Aug. 19, 2010, and entitled "Systems and Methods for Managing Marketing Programs on Multiple Social Media Systems", which is incorporated by reference herein.

According to one embodiment, aspects of the present systems and methods may comprise features or components of the social relationship management system (SRMS) described in U.S. patent application Ser. No. 12/859,675 (referenced above). Specifically, in one embodiment, the functionality described herein that enables a user may create associations between web pages and social media pages comprises an add-on feature an embodiment of the SRMS described in U.S. patent application Ser. No. 12/859,675. Accordingly, in such embodiments, the presently-described systems and methods are interconnected with and utilize overlapping functionality of a SRMS system. Of course, in other embodiments, the systems and methods recited herein comprise standalone features that are not part of a larger overall marketing or social relationship management system.

In the present disclosure, a high level summary of actions (as shown in FIG. 1) involving SGMS users 102 and the SGMS 110 are indicated as numbered steps with the numbers "1" through "10" in FIG. 1, and will be described next. Furthermore, detailed interactions involving SGMS users 102, the SGMS 110 and other associated components in an exemplary environment will be illustrated in connection with a sequence diagram in FIG. 4. In the illustrations shown in the accompanying screenshots, and as will be seen, an exemplary SGMS user 102 (sometimes referred to as "Jeff") utilizes an embodiment of the SGMS 110 to create and manage associations between web pages of a fictitious organization called "Acme Coffee" and social media pages hosted by a hypothetical social media system called "Eyetext". As will be understood and appreciated, the exemplary and illustrative "Jeff," "Acme Coffee," and "Eyetext" are meant to represent sample system users, companies, and social media systems (respectively) to aid in the understanding of the present system, and are not intended to limit the scope of the present disclosure in any way.

Continuing with FIG. 1, according to one embodiment, at step "1" SGMS users 102 access the SGMS 110 via a SGMS user interface 104 over a communication network 108 (such as the Internet) in order to create, manipulate and manage associations electronically between social graphs (generated due to complex interconnections arising from published content on social media pages 126 of individuals, organizations, and corporate entities and hosted by social media systems 122) and web pages 118. Specifically, in one embodiment, SGMS users utilize the SGMS to insert social graph objects or social media plugins relating to social media systems into traditional web pages, and subsequently manage the functionality of those social graph objects or social media plugins. Generally, web pages of SGMS users 102 are owned by the users themselves, or, such web pages belong to other persons or entities, wherein SGMS users 102 utilize an embodiment of the SGMS 110 to create and manage associations between web pages 118 and social media pages 126.

Figure 10B:
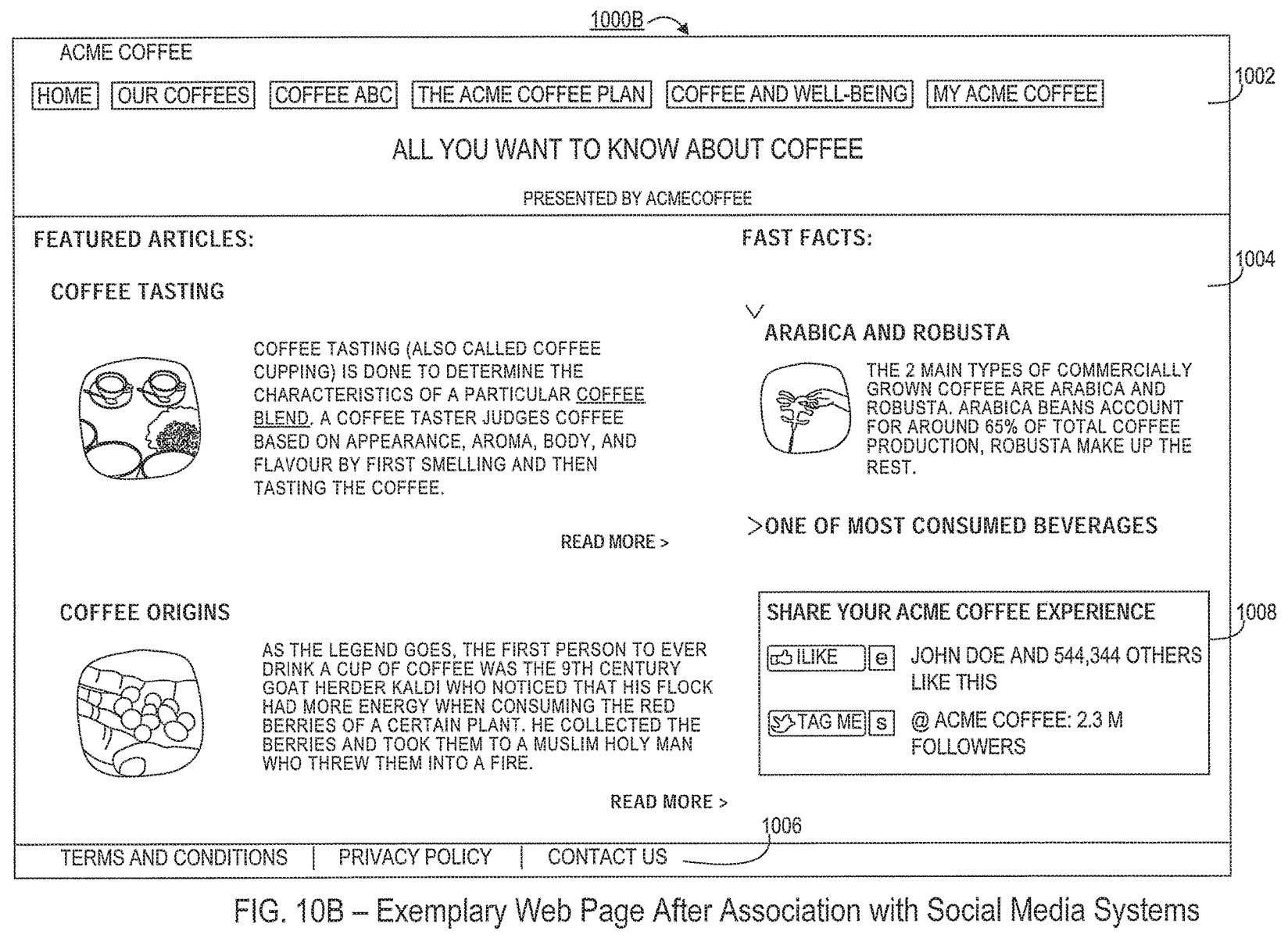

As can be seen from FIG. 1, after successful login by an SGMS user 102, the SGMS 110 displays (at step "2") a social graph object creation form 106 to SGMS user 102 for purposes of creating social graph objects. As described previously and as referred to herein, the term "social graph objects" generally refers to data structures developed according to a social graph protocol that is a computer programming protocol followed by a social media system. Generally, a social graph object will include a "social media plugin," which is essentially software code that enables communication and sharing of information between the social media plugin and a corresponding social media system. Thus, examples of social media plugins include the "Like" button on FACEBOOK™, the "re-tweet" functionality of TWITTER™, and many others that are known to those of ordinary skill in the art. An exemplary screenshot showing a social graph object creation form 106 is displayed in FIG. 7 (discussed in greater detail below). Social graph object creation form 106 generally contains various fields such as "title", "type" "url," etc., in connection with web page 118 and the social graph object that will be created. Various software modules and engines that comprise an embodiment of the SGMS and are involved in the creation of social graph objects will be discussed in connection with FIG. 2. Exemplary screenshots showing social graph objects created by an embodiment of the SGMS 110 (and stored in an exemplary database SGMS 114) are illustrated in FIGS. 6, 9, and 10B.

With reference to FIG. 1, at following step "3", a SGMS user 102 fills out the displayed social graph object creation form 106 and submits it to the SGMS 110 for creation of social graph objects. Details of a computer-implemented method performed by an embodiment of the SGMS to create social graph objects graphs will be described with a flowchart in connection with FIG. 3.

It will be understood that SGMS users 102, as discussed in the present disclosure, include individual users, and in some scenarios, one or more SGMS users 102 can be affiliated with an organization or corporate entity. For example, an SGMS user might be a marketer or advertiser associated with a company, or may be generally understood to represent the marketing department or company as a whole. As will be further understood by a person of ordinary skill in the art, SGMS users 102 can also be users of social media systems 122 and own or use social media pages 126. Therefore, as discussed herein, the term "user" is intended to relate to individuals or companies who use an embodiment of the SGMS 110, i.e. an SGMS user 102, to create and manage social graph objects and associations between web pages and social media systems. In some circumstances, however, the term "user" is used in the context of persons or entities who own or use social media pages (which may also be users of the SGMS). In this disclosure, it should be discernable from the context regarding the type of user being discussed.

Still referring to FIG. 1, according to an aspect of the present disclosure, creation of social graph objects further comprises the SGMS 110 creating one or more intermediary pages, for example, a pseudo page 120 and a redirector page 124 at steps "4*a*" and "4*b*" respectively, using information entered by the SGMS user 102. Exemplary intermediary pages, i.e., pseudo page 120 and redirector page 124, generally comprise meta tags (provided by social media systems) and meta data provided in the form of SGMS user's inputs.

As the name implies, and as described subsequently herein, a redirector page 124 redirects web traffic originating from the social media system to the web page 118. On the other hand, a pseudo page 120 presents information related to the web page 118 to the social media system 122 in the form of meta tags and meta data. According to one embodiment, the functionalities of the pseudo page 120 and the redirector page 124 can be combined into a single intermediary page. As will be understood, such intermediary page(s) provide the benefit of robust associations (linkages) between web pages and social media pages, in the event of updates to the web page, unforeseen crashes by the web pages or systems associated with hosting of the web page, and other issues. Additional functionalities (and corresponding benefits) of intermediary pages will be better understood in the discussions that follow. Details of the process performed by various software modules and engines included in an embodiment of the SGMS 110, and involved in creation of intermediary pages, are explained with a flowchart in FIG. 3.

After creation of the intermediary pages, the social media system (SMS) 122 interacts with the SGMS 110 via network 108 to activate the social graph objects with the help of the information provided by the pseudo web page 120 at step "5". As will be understood and appreciated, network 108 may comprise a wide area network, virtual public or private network, the world wide web (Internet), or other similar network. Exemplary screenshots showing a list of active social graph objects (stored in exemplary SGMS database 114) are displayed in FIG. 6 and FIG. 9.

According to another aspect of the present disclosure, the SGMS user's inputs in social graph object creation form 106 (received at step "2") are used by the SGMS 110 to configure a social media plugin that will be involved in tracking interactions between the web page 118 and social media pages. As mentioned previously, a "social media plugin" comprises a means of communication between a social media system and a web page. In one embodiment, social graph objects include social media plugins to enable such communication and information-sharing. Thus, social media plugins enable web page visitors to provide information relating to a corresponding social graph object, interact with the object, share the object with others, etc. Examples of such "social media plugins" include the "Like" button of FACEBOOK™, Activity Feed box of FACEBOOK™, Share button of LINKEDIN™, Tweet button of TWITTER™, and many others. Such social media plugins can be inserted by the SGMS user 102 into the web page 118. According to one embodiment, the social media plugin communicates user activity related data to the SMS 122, and the data is retrieved subsequently by the SGMS 110 for purposes of tracking and analytics. Thus, at step "6", the SGMS 110 configures a social media plugin and further displays associated source code 116 for the social media plugin to the SGMS user 102. It will be understood that configuration of a social media plugin involves using information entered by SGMS user 102 on an unconfigured social media plugin provided by a social media system 122. An exemplary screenshot showing source code 116 for a configured social media plugin is displayed in FIG. 8.

After receiving source code 116 for the configured social media plugin (or other social graph object), SGMS user 102 inserts (at step "7") source code 116 in the user's web page 118 that allows tracking and capture of analytics related to user activity and engagement of persons visiting the web page 118 with the social graph object and associated social media pages 126. In one aspect, the social media plugin also displays (on web page 118) the number of times a web page 118 has been liked or appreciated by social media system users who have interacted with the web page 118.

Consequently, web visitor 130 interacts with the web page 118 and further with the social media plugin (or other social graph object) on the web page 118. In one embodiment, interactions of the web visitor 130 with the web page 118 are published as a message on the visitor's social media page 126, as shown in step "9" in FIG. 1. According to one embodiment, such a message published on the visitor's social media page 126 comprises a direct link pointing to the redirector page 124 (shown with a thick arrow in FIG. 1) along with a brief summary of the web page. Friends 128 of the visitor 130 on the social media system 122 are able to review (step "10" in FIG. 1) the message on the web visitor's social media profile page 126. Further, according to one embodiment, when a friend of the web visitors clicks a link attached to the message on the visitor's social media page (or otherwise interacts with the message), information regarding that interaction will first momentarily arrive at the redirector page 124, and subsequently will be routed from the redirector page 124 to the web page 118 (as shown with a thick arrow in FIG. 1). According to another embodiment, interactions by web visitor 130 with web page 118 are communicated to the SMS 122 by the embedded configured social media plugin in web page 118. Subsequently, data pertaining to such interactions involving web visitors 130 and web pages 118 are retrieved by the SGMS 110 from the SMS 122.

In yet another embodiment, interactions involving web visitors 130 and web pages 118 are communicated directly to the SGMS 110, which then informs the SMS 122 about the interactions. Details of the interactions involving a web visitor 130, the SGMS 110, a SMS 122, and a SGMS user 102 are shown with a sequence diagram in FIG. 4. As will be understood by one of ordinary skill in the art, an outcome of the present system, as described above, is that web traffic is driven (for example, social media system friends of a web visitor) to the web page that is associated with social media system pages, resulting in greater credibility and popularity of the web page. Exemplary screenshots of a web page (belonging to exemplary organization Acme Coffee) before and after creating associations between the web page and exemplary social media systems, are shown in FIG. 10A and FIG. 10B.

As will be understood, electronic communications involving various components such as the SGMS 110, SGMS users 102, web visitors 130, social media systems (SMS) 122, SMS friends of the visitor 130, and intermediary pages (for example, pseudo page 120 and redirector page 124) typically proceed through a network 108, using one or the other services, such as a Web-deployed service with client/service architecture, a corporate Local Area Network (LAN) or Wide Area Network (WAN), or through a cloud-based system. Further, as will be understood and appreciated, various networking components like routers, switches, hubs etc., are typically involved in the communications. Although not shown in FIG. 1, it can also be further understood that such communications may include one or more gateways/firewalls that provide information security from unwarranted intrusions and cyber attacks.

Those skilled in the art will understand and appreciate that creating and managing associations between a web page and social media systems, as performed by an embodiment of the SGMS 110 and described herein, involves an easy-to-use interface and further promotes greater interactions between web page visitors (or, simply web visitors, in short) and social media systems users, consequently driving greater web traffic to the web page, resulting in greater credibility and popularity of the web page. According to one embodiment of the present disclosure, various analytics related to user activity and engagement of persons visiting the web page and associated social media pages are collected by the SGMS 110 and stored in an exemplary SGMS database 114. Exemplary data tables showing representative user activity analytics stored in SGMS database 114 are shown in FIG. 5.

As will be understood, the embodiments discussed herein are for illustrative purposes only. The discussion above in association with FIG. 1 is intended to merely provide an overview of an embodiment of the present system for creating and managing flexible yet robust associations between social media pages and web pages, and is not intended to limit in any way the scope of the present disclosure. Accordingly, various other embodiments of the SGMS that use other ways (for example, using multiple social media plugins from a various social media systems, or even allowing SGMS users the option of choosing various social graph objects and the corresponding social media systems they desire) are possible, as will occur to one of ordinary skill in the art. According to another embodiment, analytics pertaining to user activity and interactions with social graph objects embedded in traditional web pages are displayed to SGMS users in real time or non-real time. Alternate embodiments can also use various user activity and interactions criteria, some or all of which may be different than the ones discussed herein.

Turning now to FIG. 2, an exemplary SGMS architecture 200 is shown, involving architectural details of the social graph manager (SGM) 112 (further comprising various software modules and components), communicating with a SMS management module 202 that is a part of an exemplary social media system (SMS) 122. As shown in the embodiment in FIG. 2, a SMS 122 includes a SMS management module 202 that contains various standards, rules, and policies in connection with social media pages hosted by a SMS. For example, a SMS 122 generally has specific configurations such as application programming interfaces (APIs) for developers and software programmers to access or publish content on social media pages hosted by the respective SMS. For example, APIs for various social media plugins that offer various features and rules for communicating with the SMS 122, are stored in a SMS management module 202.

In another example of functionalities of a SMS management module 202, various components such as users, events, pages, video clips, and the connections between them (e.g., friend relationships, shared content, and photo tags), are often represented as objects (or, generally computer data structures) on a social graph. Information related to such objects can be exchanged using specific standards and formats such as HTML (Hyper Text markup Language) or Extensible Markup Language (XML). Even further, a SMS 122 could have strict guidelines on the privacy of users' pages. For example, a SMS 122 might allow third party developers and software programmers to access only publicly available information on social media pages. To obtain additional information about a social media page, developers must first obtain the page owner's permission. Such a permission can be granted by a page owner in the form of an "access token", i.e. a software certificate conferring proper rights and privileges. Third party developers can perform authorized requests on behalf of a user by specifying the access token of a user in an API request. Those skilled in the art will understand and appreciate that various other functionalities related to communicating with social media pages (hosted by a respective SMS 122) are handled by a SMS management module 202.

As shown in FIG. 2, the SGM 112 communicates with a SMS management module 202 over a network 108, for purposes of creating and managing associations between web pages 118 (for example, hosted by a web page hosting service provider 204) and social media pages 126. As will be understood, creating and managing such associations further comprises creation of intermediary pages by an embodiment of the SGMS 110. It will be further understood that the intermediary pages provide the benefit of robust associations (linkages) between web pages and social media systems, in the event of unforeseen crashes by the web pages or systems associated with hosting of the web page (for example, web page hosting service 204).

According to an embodiment of the present disclosure, the SGM 112 further comprises several software modules, for example, a user interface (UI) module 206, a data processing module 208, and a redirection module 210. As will be understood by one of ordinary skill in the art, various other modules and software engines can comprise an embodiment of the SGMS 110. The modules and software engines discussed in connection with FIG. 2 are for illustration purposes only, and alternate embodiments are not limited to the specific modules and software engines discussed herein.

In one embodiment of the SGMS 110, UI module 206 stores computer code needed to interface and interact with SGMS users 102 via a user interface 104. For example, UI module 206 displays a social graph object creation form 106 (illustrated with exemplary screen shots in FIG. 7 and FIG. 8) to SGMS users 102. Examples of various entries in such a form include (but are not limited to) title, url, type of social graph object, etc. Subsequently, after SGMS users enter the relevant information through the user interface 104, such information is received by the UI module 206. According to one embodiment of the present disclosure, information received from SGMS users 102 is stored in an exemplary SGMS database 114 before being processed by other modules and engines.

Still referring to FIG. 2, information related to creation of social graph objects and received by UI module 206 is then processed by the SGMS 110 to create social graph objects and intermediary pages. It will be understood that social graph objects newly-created by the SGMS 110 are usually activated by communicating an activation request to SMS 122. In turn, the SMS 122 validates and activates a newly created social graph object before further manipulations are performed on the social graph object by the SGMS 110 and/or the SMS 122.

According to one aspect of the present disclosure, information provided by SGMS users 102 is processed by a data processing module 206. According to another aspect of the present disclosure, processing such information involves generating unique meta data from the information provided by SGMS users, in conjunction with meta tags provided by the respective SMS 122. As will be understood, meta data and meta tags are usually developed according to a social graph protocol that is a computer programming protocol followed by a social media system for communicating with external web pages. In addition to generating meta data and meta tags, in one embodiment, the data processing module 208 is also involved in the configuration of a social media plugin that will be inserted in web page 118. As will be understood, usually one or more unconfigured social media plugins are provided by SMS's 122 to create social graph objects on traditional web pages. Generally, social media plugins allow web page owners to integrate features and functionalities of social media page into external web pages 118. In an embodiment of the present SGMS 110, source code for a configured social media plugin is provided to SGMS users 102 to be inserted in web pages 118, wherein the configuration is generally performed with the help of information provided by SGMS users 102.

Further, in one embodiment, developed meta data and meta tags are used by the SGMS acting as an intermediary system that induces greater flexibility and streamlining in the processes of creating, and managing the associations between social media pages and web pages owned by individuals, organizations and corporate entities. According to one aspect, the intermediary system includes a redirector page 124 hosted in a redirection module 210 that redirects web traffic originating from the social media system 122 to the web page 118, in addition to a pseudo page 120 that presents information related to the web page 118 to the social media system 122 in the form of meta tags and meta data.

According to one embodiment of the present disclosure, various analytics related to user activity and engagement of persons visiting web page 118 based on interactions with social graph objects associated with those web pages are collected by the SGMS 110 and stored in an exemplary SGMS database 114. Exemplary data tables showing representative data stored in an SGMS database 114 are shown in FIG. 5. Such analytics are displayed to SGMS users 102 for reporting of user activity analytics. Further, such analytics can be provided as reports in electronic and/or print form that can also be customized to suit the requirements of SGMS users 102 who wish to review such reports.

Now referring to FIG. 3 (further consisting of FIG. 3A and FIG. 3B), an exemplary social graph object creation and management process 300, as performed by an embodiment of the SGMS 110, is illustrated with the help of a flowchart. As will be understood and appreciated, the steps of the process 300 shown in FIG. 3 are not necessarily completed in the order shown, and various steps of the SGMS may operate concurrently and continuously. Accordingly, the steps shown in FIG. 3 are generally asynchronous and independent, computer-implemented, tied to particular machines (including various modules/engines of the SGM 112, coupled to databases, users' devices to access the SGMS server(s), and/or one or more social media systems), and not necessarily performed in the order shown.

As recited previously, according to one embodiment of the present disclosure, the system disclosed herein provides greater flexibility in streamlining the creation and management of electronic associations between web pages and social graphs. For example, if a person buys a product from a merchant via the merchant's web page, wherein the merchant's web page is linked with a social media system, then such a linkage facilitates sharing of the information related to the product with friends and fans of the person on the social media system, wherein the merchant's web page and social media pages are typically represented as objects in a social graph.

Generally, a "social graph" is constructed according to a social graph protocol followed by a social media system. An example of a social graph is the "Open Graph", which is based on a social graph protocol called as the "Open Graph Protocol" followed by the social media system FACEBOOK™. A social graph protocol enables web page owners to associate their web pages with social media systems (and social media profile pages of users on a social media system). Typically, a web page can be made to have similar features as a social media page by including meta tags associated with a social graph protocol in conjunction with social graph objects (such as social media plugins) on the web page. As described previously, "social graph objects" are generally computer data structures that are developed using social graph protocols followed by social media systems. In one instance, social graph objects can be created by including social graph protocol meta tags on a web page, in addition to social media plugins provided by the social media system. For example, an article posted on a news publication web page can be turned into a social graph object by associating a social media plugin with data relating to the article, thus providing social media system functionality in connection with the article. Generally, meta tags provide a structure and organization of the information that the social media system can retrieve, including content type, thumbnail image, video size and many other details.

This means, for example, when a visitor clicks on social media plugin on a web page, an association is made automatically between the web page and the visitor's social media page. The social media plugin allows the visitor to share content related to the web page with the visitor's friends on the social media system. In one example of a social media plugin, the plugin generates a post on the visitor's social media profile page containing a link back to the web page. In many scenarios, the web page typically appears in an exemplary "Interests" section (or, potentially at some other location) of the visitor's social media profile page, and the web page owner further is provided the ability to publish updates to the visitor's social media profile page, because of the automatic association between the pages. In the discussions that follow, an exemplary process of creating and managing such associations will be described with the help of a series of computer implemented steps performed by an embodiment of the SGMS 110.

Starting at step 302, the SGMS receives credentials (e.g., login/password) of a SGMS user 102 via a user interface 104 for creation or management of social graph objects. Although not shown in FIG. 3, it will be understood that in the event the user credentials submitted by a user 102 are invalid, a corresponding error message is displayed on the user's screen via the user interface 104, and the process exits thereafter.

If credentials of the SGMS user 102 are valid, then according to one embodiment, the SGMS 110 retrieves pre-created and pre-stored social graph objects (if any) from a database (for example, SGMS database 114). These pre-stored social graph objects may be revised and updated, as described subsequently herein. At step 304, the social graph object creation form is displayed to the SGMS user to be completed by the user for purposes of creating associations between a web page and social media systems. (Screenshots of a graphical user interface (GUI) displaying an exemplary social graph object creation form 106 are shown in FIG. 7 and FIG. 8).

Usually, a social graph object creation form 106 comprises various fields that are required properties of the social graph protocol followed by the social media system. Such fields include (but are not limited to) a title of a social graph object (e.g., "How to make the perfect brew coffee"), a type of: social graph object (e.g., activity, article, restaurant, video, etc.), an image illustrative of the social graph object in the associated social graph(s), a URL (e.g., "http://www.acmecofffee.com") of a web page that represents a social graph object in the associated social graph(s)m, and others. As will be understood by a person skilled in the art, a list of various types of social graph objects that are likely to be included in social graphs are usually predetermined by social media systems. Furthermore, according to one embodiment, the SGMS provides the ability to create custom social graph object types that are not predetermined by social media systems.

In addition to the URL (e.g., "http://www.acmecofffee.com") of the web page that will be associated with a social media system (e.g., Eyetext), in one embodiment, a SGMS user also provides an external domain (also referred to as a slug domain), wherein the external domain will host a redirector page. As will be seen in the screenshots in connection with FIG. 7, an exemplary external domain for a redirector page of Acme Coffee is given by acmecoffeeexternaldomain.com. Since an external domain can host multiple redirector pages corresponding to multiple social graph objects, a unique identifier (sometimes referred to as a slug identifier in a social graph object creation form) is entered by a SGMS user that uniquely identifies the redirector page associated with the respective social graph object. An example of a slug identifier in connection with Acme Coffee's social graph objects is provided by a SGMS user as "perfectbrew".

As recited previously, social graph object creation forms generally include a field for an image illustrative of the respective social graph objects that will be created. Such images can typically be uploaded by SGMS users from their computing devices through a user interface. Additionally, as will be understood, social graph object creation forms often request that SGMS users enter an admin ID that is a unique ID (comprising a string of numbers and alphabetic characters for example) provided by social media systems to identify individuals and entities who own or use social media pages on the respective social media systems. In various scenarios, such individuals include SGMS users.

After a SGMS user fills out a social graph object creation form thereby providing information and submitting it through a user interface, the form is received by the SGMS at step 306. As will be understood by one of ordinary skill in the art, information provided by SGMS users is stored in an exemplary SGMS database 114.

At next step 308, the SGMS creates meta data using information provided by SGMS users and meta tags provided by social media systems. As recited previously, meta tags provide a structure and organization of the information of a web page that the social media system can retrieve, including content type, thumbnail image, video size and many other details. Generally speaking, meta data and meta tags comprise specialized programming language keywords created according to a social media protocol that is followed by a social media system. As will be seen next, information provided by a SGMS user (at step 310) will be used to configure a social graph object (e.g., a social media plugin).

As mentioned previously, in one embodiment, a social media plugin in used to create a social graph object in a web page. Under this embodiment, at step 310, the SGMS configures a social media plugin that will be inserted by the web page owner in the web page for tracking of user activity related data on the web page. It will be understood that in one embodiment, a configured social media plugin communicates user activity-related information directly to a SMS. In another embodiment, such interaction information is communicated first to the SGMS, and then to an SMS for processing. Generally, social media plugins provided by social media systems allow integration of interactive features of social media systems on web pages, and further allow communication between social media profile pages and web pages. As a result of such features, it will be understood that social media plugins are useful tools for web page owners in driving web traffic to their web pages, consequently realizing greater credibility and popularity of their web pages. For instance, owners of web pages can insert on their web pages an exemplary social media plugin called the "ILike" button provided by a fictitious social media system called "Eyetext". An ILike button allows visitors who visit the web page to publish a message comprising related content, a miniature image (provided by SGMS users through a social graph object creation form interface and thereafter received by the SGMS at step 308) illustrative of the web page, and links to the web page on the visitor's profile page on Eyetext. Although configuration of a single social media plugin for a specific social media system is discussed in this flowchart, it will be understood that in alternate embodiments, the SGMS can configure several social media plugins that allow different features, the social media plugins being associated with a variety of social media systems.

Still referring to FIG. 3, after a social media plugin is configured, the SGMS creates (at step 312) a pseudo page that presents information to a respective social media system in connection with the web page (that is represented as a social graph object in the associated social graphs), wherein the information is presented in the form of meta tags and meta data created previously by the SGMS. In an embodiment of the SGMS, the SGMS creates at step 314 a redirector page (comprising meta data and meta tags) that redirects web traffic originating from the social media system to the web page. Functionalities of the redirector page will be described next with an exemplary scenario.

In an exemplary scenario involving creating and managing associations between a web page http://www.acmecoffee.com of an organization called Acme Coffee with a social media system, a SGMS user provides information related to Acme Coffee's web page to the SGMS for creation of social graph objects. Thereafter, the SGMS creates social graph objects and intermediary pages comprising meta data and meta tags. Further, the SGMS configures (using information provided by the SGMS user) an ILike button (an exemplary social media plugin of a social media system called Eyetext), and provides source code of the configured ILike button to the SGMS user. Owner of Acme Coffee's web page (or, possibly the SGMS user) inserts the source code for the configured ILike button in Acme Coffee's web page.

Thereafter, in one embodiment, the social graph object associated with this web page is activated by Eyetext. Following the activation, web page visitors visiting the web page interact with the web page and further with the social media plugin on the web page. Interactions of the web visitor with the web page are published as a message on the visitor's social media page along with a brief summary, including a URL and an image illustrative of the web page. Further, as will be understood, in one embodiment, the aforementioned URL hosts a redirector page (located at an exemplary web address given by http://www.acmecoffeeexternaldomain.com/perfectbrew) that redirects web traffic originating from an exemplary social media system called Eyetext to the original web page http://www.acmecoffee.com.

Friends of the web visitor on the social media system can review the message on the web visitor's social media page (such as the visitor's social media profile page). Further, according to one embodiment, upon clicking the URL attached to the message, friends of the visitor will be first redirected to the redirector page (exemplarily, http://www.acmecoffeeexternaldomain.com/perfectbrew) and subsequently will be routed from the redirector page to the web page (exemplarily, http://www.acmecoffee.com). Generally, this redirection occurs virtually instantaneously, such that a user will not notice the redirection. Consequently, and as will be understood, analytics related to user activity and interactions are provided by the embedded social media plugin directly to the SMS. Such analytics are then subsequently retrieved from the SMS by the SGMS, for display to SGMS users. According to another embodiment, interactions by web visitor with the web page are first communicated to the SGMS by the embedded configured social media plugin in the web page, and then to the SMS for storage and subsequent processing.

Continuing with the description of FIG. 3, at step 316, according to one embodiment of the present disclosure, the SGMS creates database entries in an exemplary SGMS database 114 for storing analytics related to user activity and engagements (illustratively shown in FIG. 5) in connection with web visitors who visit the web page (exemplarily, Acme Coffee's web page http://www.acmecoffee.com) and social media pages associated with that web page.

As mentioned previously, in one embodiment, a social media system involved in the association with the web page will activate and validate social graph objects (previously created in step 308) associated with the web page. Hence at next step 318, the SGMS communicates a request to a respective social media system to activate and validate the respective social graph objects. Consequently, a social media system activates and validate the social graph objects by crawling the pseudo page (and reading meta data and meta tags contained therein) created previously in connection with the web page, and storing information relating to the respective objects in its databases.

Upon validation and activation by the respective social media system, the SGMS displays (at step 320) source code for the configured social media plugin (exemplarily, a ILike button) to the SGMS user to be inserted in the web page (exemplarily, Acme Coffee's web page). An exemplary screenshot showing source code for a configured social media plugin as displayed to a SGMS user is indicated in FIG. 8. As will be understood and appreciated, in one embodiment, this source code is automatically inserted into the SGMS user's web page code by a third party system, or based on a link between the SGMS and the user's web page.

After the source code for the configured social media plugin has been inserted in the web page, web page visitors visiting the web page interact with the web page and further with the social media plugin on the web page. In an embodiment, interactions involving web visitors and web pages are communicated directly to the respective social media systems by the social media plugin embedded in the web page. Subsequently, the social media system informs the SGMS about the interactions, in response to a query (in connection with the interactions) by the SGMS.

Generally, interactions of the web visitor with the web page are published as a message on the visitor's social media page along with a brief summary of the web page, along with a URL to a redirector page. Then, friends of the web visitor on the social media system who review the message on the web visitor's social media profile page, and further, when they click on the URL attached to the message will first momentarily arrive at the redirector page (exemplarily http://www.acmecoffeeexternaldomain.com/perfectbrew), and subsequently will be routed from the redirector page to the web page (exemplarily http://www.acmecoffee.com).

Consequently at step 322, the SGMS processes the redirector page in order to extract analytics (illustratively shown in FIG. 5) related to user activity and engagements in connection with visitors who visited the web page and/or social media pages of users who have visited the web page. Furthermore, the SGMS processes the redirector page in order to direct web traffic originating from the social media system to the web page. According to one embodiment, the SGMS displays (at step 324) analytics related to user activity and engagements in connection with the web page to SGMS users.

According to an aspect of the present disclosure, the SGMS, can be utilized to manage previously created associations between web pages and social media pages. For example, the SGMS allows SGMS users to make changes or update pre-created social graph objects, including those that have been activated and validated by social media systems. In one instance, SGMS users can change the description associated with social graph objects. Further, in another instance, a SGMS user may change the title, the name or the image, the URL, the external (slug) domain, the unique (slug) identifier, and various other attributes associated with a pre-created social graph object. In such instances, the SGMS user can make the necessary changes to the social graph object through a user interface that displays a social graph object update form. An exemplary social graph object update form (that includes an exemplary "Update Social Graph Object" button 720) is shown in FIG. 8. It will be understood that the effect of such changes to social graph objects, will not affect the associations created between the web page and social media pages. However, the effect of such changes will be reflected in published (both retroactive and subsequent) content on the social media pages associated with the web page. For example, if a SGMS user replaces the image of a pre-created social graph object, then in every message (or post) published in social media pages associated with that social graph object, the previous image will be replaced by a new image. As will be further understood and appreciated, SGMS users can make changes to social graph objects to point to different URLs. For example, a SGMS user can transfer previously created associations between social media pages and www.acmecoffee.com, to another exemplary URL www.acmebeverages.com, without causing the associations to break. In this example, a reconfigured source code of a social media plugin typically should be inserted in the web page www.acmebeverages.com.

As will be understood, the intermediary page(s) create(s) an intermediary platform for associations between the web page and social media systems. In other words, if the web page (exemplarily http://www.acmecoffee.com) goes down or crashes for some reason, the intermediary page(s) (for example, a redirector page http://www.acmecoffeeexternaldomain.com/perfectbrew) which is (are) linked to social media pages are not affected. Generally speaking, the social graph objects "clone" certain properties of the web page using the intermediary page(s), and hence changes (including updating the content) of the web page will not affect the previously created associations between the web page and social media pages.

It will be understood that the steps discussed in connection with the above flowchart are for illustrative purposes only, and not intended to limit the scope of the present disclosure. Alternate embodiments of the SGMS can involve variations of the steps discussed herein, for example a single intermediary page that functions as a redirector page and a pseudo page depending upon whether such an intermediary page is accessed by a social media page user or a social media system.

Now referring to FIG. 4, a sequence diagram 400 is shown that illustrates a series of interactions between SGMS users, the SGMS, social media systems, and web visitors (i.e., visitors to the SGMS user's web page), according to an embodiment of the SGMS. As will be understood, the components involved in an exemplary creation and manipulation process include a SGMS user 102, an embodiment of the SGMS 110, one or more web page visitors 130, and one or more SMSs 122. Further, as will be understood, a system user 102 accesses the SGMS 110 online via computers, smart phones or any other Internet-enabled computing device. However, it will be understood that no such limitation is imposed, and alternate embodiments can use multiple SMSs, and even involving associations with multiple web pages. According to one aspect of the present disclosure, various functionalities of a SMS 122 discussed in FIG. 2 in connection with communicating with social media pages are handled by a SMS management module 202.

As shown in FIG. 4, at step 1, a SGMS user 102 logs into the SGMS 110 using the user's credentials (login/password) through a user interface. Next, at step 2, the SGMS authenticates the SGMS user 102. If the user's credentials are not valid, the SGMS 110 displays a message indicating that the user's credentials are not valid.

If the user's credentials are valid, the SGMS 110 displays a social graph object creation form for purposes of creating associations between a web page and a social media system. (Screenshots of a graphical user interface (GUI) displaying an exemplary social graph object creation form are indicated in FIGS. 7 and 8). Then, at step 4, the user provides information to the SGMS by filling out the social graph object creation form. After the SGMS user 102 fills out a social graph object creation form, thereby providing information and submitting it through a user interface, the form is received by the SGMS 110.

At next step 5, the SGMS 110 creates social graph objects for purposes of building associations between profile pages on social media systems and web pages. In one embodiment, a process of creating social graph objects further comprises creating meta data using information provided by SGMS users and meta tags available from social media systems. As recited previously, meta tags provide a structure and organization of the information of a web page (which will be associated with social media systems) that the social media system can retrieve, including content type, thumbnail image, video size, and many other details. Generally, meta data and meta tags are developed according to a social media protocol that is followed by a social media system. In the present example, information provided by a SGMS user (at step 4) will be used by the SGMS 110 to configure a social media plugin.

Still referring to FIG. 4, at step 5, the SGMS 110 configures a social media plugin that will be inserted by the web page owner in the web page. As mentioned previously, the social media plugin is used to provide social media functionality to an object associated with a web page, thereby creating a social graph object in the web page. As will be understood, social media plugins provided by social media systems allow integration of interactive features of social media systems on web pages, and further allow communication between social media profile pages and web pages.

After a social media plugin (or other social graph object) is configured, the SGMS 110 creates intermediary pages such as a pseudo page and a redirector page. A pseudo page presents information to the social media system 122 in connection with the web page (that is represented as a social graph object in the associated social graphs), wherein the information is presented in the form of meta tags and meta data created previously by the SGMS 110. In an embodiment of the SGMS 110, the SGMS further creates a redirector page (comprising meta data and meta tags) that redirects web traffic originating from the social media system to the web page. Details of the process performed by various software modules and engines included in an embodiment of the SGMS 110, and involved in creation of intermediary pages, have been explained previously with a flowchart in FIG. 3.

In the embodiment shown in FIG. 4, after creation of the intermediary pages, the social graph object associated with this web page is activated by a SMS 122. Hence, after creation of the intermediary pages, the SGMS 110 communicates (at step 6) a request for activation and validation of social graph objects created at step 5. Consequently, a respective social media system (SMS) crawler 122 visits (at step 7) the pseudo page created by the SGMS 110 in order to activate and validate the social graph objects.

Following the activation, in one embodiment, at step 8, the SMS 122 saves metadata extracted from the pseudo page (or, any other intermediary page) in a SMS database 114, in order to keep track and store analytics of user activity and engagement in connection with interactions between the web page and social media system users.

Next, at step 9, the SGMS 122 displays source code for a configured social media plugin (that was previously configured in step 5). In one embodiment, configuration of a social media plugin involves using information entered by SGMS user 102 on an unconfigured social media plugin provided by a social media system 122. An exemplary screenshot showing source code for a configured social media plugin is displayed in FIG. 8.

After receiving source code for the configured social media plugin, a SGMS user 102 inserts (at step 10) the source code in the web page in order to allow tracking and capture of analytics related to user activity and engagement of persons visiting the web page and associated social media pages. As mentioned previously, in one embodiment, steps 9 and 10 are performed automatically by the SGMS or another third party system, and the SGMS user is not required to manually embed such source code into the web page. Examples of analytics related to user activity and engagement, as displayed in FIG. 5, include (but are not limited to) the number of times certain content on the web page has been liked and/or recommended by social media system users, recent (and even real time) activities on a web page involving friends of a visitor of a web page, wherein the visitor as well as the visitor's friends have social media profile pages, originating IP address, and various other analytics desired by web page owners.

Next, web page visitors 130 visit the web page and interact with the web page and further with the social graph object (e.g., the social media plugin) on the web page. Interactions between a web visitor 130 and the web page are communicated (at step 11) to the SMS 122 by the configured social media plugin embedded in the web page. Then, at step 12, data related to the interactions will be stored in the SMS. Subsequently at step 13, the social media system informs the SGMS of the interactions and information relating thereto, either automatically or in response to a query by the SGMS. At step 14, the SGMS processes the information received from the SMS to provide analytics, trends, and other helpful information regarding the social graph object (and web visitor interaction therewith) to SGMS users. Eventually, at step 15, related analytics (for example, various, user metrics in connection with the interactions will be displayed) to SGMS users 102. Example of such metrics include (but not limited to) the number of times certain content on the web page has been liked and/or recommended by social media system users, recent (and even real time) activities on a web page involving friends of a visitor of a web page, originating IP address for users' interactions, and various other analytics required by web page owners.

Now referring to FIG. 5, an exemplary SGMS database 114 is shown, including a user analytics table 510 (stored in the SGMS database). According to one embodiment of the present system, the SGMS creates social graph objects that facilitate associations between a web page and social media systems. It will be recalled that web visitors visiting the web page will interact with the configured social graph objects created in the web page, and further user analytics are retrieved by the SGMS from such interactions between web visitors and the configured social graph objects (e.g., via social media plugins) inserted in the web page. Information relating to user interactions with the social graph objects, as well as the objects themselves, is generally stored in the SGMS database.

As seen in FIG. 5, a user analytics table illustrates various representative fields related to user activity and interactions with web pages, and associated social media systems. As will be understood, the representative fields in table 510 represents information relating to social graph objects maintained by the SGMS, as well as analytics stored by the SGMS. According to one embodiment, such analytics are captured by the SGMS in real-time, or possibly in non-real time at some periodic intervals of time, or even intermittently.

As shown, user analytics table 510 comprises exemplary columns titled "Time Stamp", "Social Graph ID", "Request Originating IP", "Social Media Systems", "Total ILikes", and "Total Tag Me". All of these data fields provide information relating to social graph objects created within the SGMS, and information relating thereto. For example, a "Time Stamp" column indicates a date and time when the information relating to the social graph object was captured, in connection with social graph objects uniquely specified in a "Social Graph ID" column. It will be understood that in capturing analytics of user activity and interactions, the SGMS keeps a track of the IP address that originates a request for the interactions, as specified in an exemplary "Request Originating IP" column in table 510. Further, the social media system involved in the interactions is stored in a "Social Media Systems" column. Even further, various social media software (for example, social media plugins configured by the SGMS named as "ILike" and "Tag Me" for fictitious social media systems (SMSs) called "Eyetext"

and "Scribble" respectively) associated with the interactions are also stored in an embodiment of the present system.

As shown in FIG. 5, one example of user analytics for a social graph object ID 156984 associated with a social media system Eyetext, reveals that a request for interacting with the aforementioned social graph object originated from an IP address at 11:30 AM on Jul. 20, 2011. Further, the number of total ILike-related interactions for this social graph object is counted as 315 until the aforementioned date and time. It will be understood that since the Tag Me social media plugin belongs to social media system Scribble, the number of total Tag Me interactions is specified as zero, in the corresponding column.

In another example, user analytics for a social graph object ID 320501 associated with a social media system Scribble, reveals that a request for interacting with the afore-mentioned social graph object originated from an IP address at 1:00 PM on Jul. 20, 2011. Further, the number of total Tag Me related interactions for this social graph object is counted as 5526 until this date and time. Since the ILike social media plugin belongs to social media system Eyetext, the number of total ILike interactions is specified as zero, in the corresponding column.

It will be understood that the types of data and information shown in page table 510 are presented merely for illustrative purposes only, and other types of data may be included, and further in different formats. For example, data and information relating to creation and storage of social graph objects themselves (such as associations between web pages, redirector pages, pseudo pages, social media systems, social graph object fields, and other related information) may be stored in database 114. Also, various other social media plugins involved in the associations between a web page and social media pages, hosted by a variety of social media systems are possible in alternate embodiments. Furthermore, analytics related to user activity can be further used in computation of various statistics, and even for visualization of data in the form of line graphs, bar graphs etc., as will occur to those skilled in the art. Next, screenshots displaying various aspects and embodiments of the SGMS will be described in the discussions that follow.

FIG. 6 illustrates a screenshot 600 of a SGMS interface showing various pre-created social graph objects by an embodiment of the SGMS as displayed to a SGMS user after logging in to the SGMS. As recited previously, social graph objects facilitate associations between web pages and social media systems. In the illustrations shown in the accompanying screenshots, an exemplary SGMS user ("Jeff") utilizes an embodiment of the SGMS to create and manage associations between web pages of a fictitious organization called "Acme Coffee" and social media pages hosted by hypothetical social media systems called "Eyetext" and "Scribble". Specifically, in one embodiment, Jeff is able to create social graph objects within the SGMS for inclusion in his company's web page.

As shown in FIG. 6, in region 602 the account (or, generally speaking login) name of a SGMS user is displayed. For example, in FIG. 6 name of the account is indicated as "Jeff". In one embodiment, the SGMS allows users to search for pre-created social graph objects using a search box (shown in region 604), adjacent to a "Search" button. Further, a SGMS user can create (and add) a social graph object by clicking on an "Add Social Graph Object" button 606. It can also be seen from FIG. 6 that the interface displays additional information of pre-created social graph objects in regions 608, 610, 612, 614, and 616. For example, as can be seen, region 608 displays social graph IDs that are unique IDs (comprising a string of numbers and/or alphabetic characters) generated by the SGMS to uniquely identify social graph objects. In addition, as recited previously, social graph objects within the SGMS usually have a title. Accordingly, region 610 displays titles of various pre-created social graph objects, e.g., in connection with Acme Coffee's web page, pre-created social graph objects include Café Latte, The Best Cappuccino, and The Rich Café Breva.

Further, the web addresses of the redirector pages for the respective social graph objects are shown in region 612. It will be understood that usually a redirector page is hosted at a domain address different from the web page for ensuring safety in the event of unforeseen crashes. For example, as can be seen from region 612 in FIG. 6, for a social graph object called "Café Latte" (listed in region 610) the corresponding redirector page is located at a fictitious address given by http://www.acmecoffeeexternaldomain.com/cafelatte.

Moreover, in region 614 of FIG. 6, the names of SGMS users and a time stamp involved in creation of the social graph objects are shown. For example, as can be seen from region 614, a SGMS user called Jeff created the social graph object called Café Latte at Mar. 2, 2011 at 2:31 AM. Although the exemplary screenshot 600 illustrates that the single SGMS user called Jeff was involved in the created of the displayed social graph objects, it will be understood by one of ordinary skill in the art that social graph objects for associating a web page with social media pages can be created by a plurality of SGMS users. It can be further seen that an exemplary social media plugin called the ILike button for an exemplary social media system called Eyetext tracks the number of users who have liked the content on the web page associated with the respective social graph objects. For example, region 616 indicates that one (1) person likes the web page corresponding to the social graph object called Café Latte, and six (6) persons like the contents on the web page corresponding to the social graph object called The Best Cappuccino.

Now turning to FIG. 7, a social graph object creation form is shown, as displayed in a user interface with various illustrative fields to be filled by SGMS users in connection with creation of social graph objects. For example, a URL of a web page (which will be associated with a social media system) is displayed in region 702. It will be understood that social media plugins (for example, an ILike button for a social media system called Eyetext) can be inserted in the web page at the URL entered by a SGMS user in region 702. At region 704, a simplified name of the web page wherein a social media plugin will be inserted, is entered by a SGMS user who is filling out the social graph object creation form. For example, a simplified name of a Acme Coffee's web page located at http://www.acmecoffee.com is specified by a SGMS user as Acme Coffee. It will be understood that the simplified name of the web page will appear at the message posted on the social media profile page of the web visitor who interacts with the social media plugins.

In region 706, a title of a web page that will be associated with a social media page, and wherein a social graph object will be inserted, is provided by a SGMS user. Example of a fictitious title as shown in FIG. 6 is "How to make the perfect brew coffee". Further, a description of a social graph object is provided by SGMS users in region 708, wherein a configured social media plugin (in this example) will be inserted. At region 710, a social graph type is entered by a SGMS user. Types of social graphs (and, in some circumstances, social graph objects) include movies, sports, tv shows, restaurants, universities, albums, authors, books, blogs, bands, food, drink, bars, and various others. As will be understood by a person skilled in the art, a list of various types of social graphs are usually predetermined by social media systems. Furthermore, according to one embodiment, the SGMS provides the ability to create custom social graph object types that are not predetermined by social media systems. It can be seen from region 711 in FIG. 7 that an image illustrative of the social graph object in the associated social graph(s) is uploaded by SGMS users from their computing devices. As can be further seen, "Browse" button adjacent to region 710 is provided for that purpose. It will be understood that in alternate embodiments, the SGMS allows a SGMS user the ability to choose an image from a list of pre-stored images.

In region 712 (indicated as a Slug Domain) of screenshot 700, an external domain address is provided by a SGMS user, the external domain hosting a redirector page. As seen in FIG. 7, an exemplary external domain address for a redirector page of Acme Coffee is given by acmecoffeeexternaldomain.com. Since an external domain can host multiple redirector pages corresponding to multiple social graph objects, a unique identifier (called in a social graph object creation form as slug identifier) is entered by a SGMS user that uniquely identifies the redirector page associated with the respective social graph object. In one embodiment, SGMS users are also able to enter (in region 716) an admin ID that is a unique ID (comprising a string of numbers and alphabetic characters for example) provided by social media systems to identify individuals and entities who own or use social media pages on the respective social media systems, wherein the SGMS user will be recognized as an administrator for the web page wherein web traffic originating from social media pages will be arriving. It can be further seen that a "Cancel" button 718 which when clicked by a SGMS user cancels creation of a social graph object as indicated in screenshot 700. Adjacent to cancel button 718 is a "Create Social Graph Object" button 720 that when clicked by a SGMS user instructs the SGMS to begin creation of social graph objects.

Now turning to FIG. 8, an exemplary screenshot 800 of a SGMS interface is shown, for management of pre-created social graph objects. As mentioned previously, screenshot 700 displays information in connection with creation of an exemplary social graph object entitled "How to make the perfect brew coffee", for an exemplary organization called Acme Coffee. As shown, screenshot 800 is similar to screenshot 700 with additional information displayed in region 802, subsequent to creation of the aforementioned exemplary social graph object. Such information comprises a unique social graph object ID that identifies social graph objects created by the SGMS uniquely, a name of a SGMS user who provided information for creating the social graph object, a time stamp when the social graph object was created, a slugs domain corresponding to an external domain that hosts a redirector page, a slug identifier that uniquely identifies the redirector page associated with the respective social graph object, and further source code for an exemplary social configured media plugin called Ilike button. It will be understood that the source code for the configured social media plugin will be inserted in the web page of Acme Coffee hosted at http://www.acmecoffee.com by the web page owner of Acme Coffee's web page. It will be further understood and appreciated that the data fields and information shown in FIG. 8 are provided for illustrative purposes only, and are not intended to limit the types or content of information displayed in such an interface.

In an exemplary scenario, an SGMS user ("Jeff") provides information to the SGMS to create a social graph object having an ID 240244 thereby creating associations between a web page http://www.acmecoffee.com of an organization called Acme Coffee, and an exemplary social media system called Eyetext. Further, web page owner of Acme Coffee's web page inserts a configured iLike button (an exemplary configured social media plugin of a social media system called Eyetext) in Acme Coffee's web page. Thereafter the social graph object associated with this web page will be activated by Eyetext. Following the activation, web page visitors visiting the web page interact with the web page and further with the social media plugin on the web page.

Although not shown herein, it will be understood that interactions of the web visitor with the web page are, in one embodiment, published as a message on the visitor's social media page (exemplarily, a social media page on Eyetext). Such a message may comprise a simplified name (as provided by a SGMS user previously through region 704 in screenshot 700) of the web page, a title (as provided by a SGMS user previously through region 706 in screenshot 700), a brief description (as provided by a SGMS user previously through region 708 in screenshot 700), an image (as provided by a SGMS user previously through region 711 in screenshot 700, and further displayed in region 722 of screenshot 800), and a URL hosting a redirector page (located at an address obtained by combining information provided by a SGMS user previously through regions 712 and 714 in screenshot 700). Exemplarily, a redirector page is located at an exemplary web address given by http://www.acmecoffeeexternaldomain.com/perfectbrew, corresponding to a slug domain address "acmecoffeeexternaldomain.com" and having a slug identifier "perfectbrew". As recited previously, the redirector page comprises meta data and meta tags that redirects web traffic originating from an exemplary social media system called Eyetext to the original web page http://www.acmecoffee.com.

According to an aspect of the present disclosure, the SGMS, can be utilized to manage pre-created associations between web pages and social media pages. For example, the SGMS allows SGMS users to make changes or update pre-created social graph objects, including those that have been activated and validated by social media systems. In one instance, SGMS users can change the description associated with social graph objects. Further, in another instance, if a SGMS user may wish to change the title, the name or the image, or the URL associated with a pre-created social graph object. In such instances, the SGMS user can make the necessary changes to the social graph object through a user interface that displays a social graph object update form. An exemplary social graph object update form (that includes an exemplary "Update Social Graph Object" button 720) is shown in FIG. 8. It will be understood that the effect of such changes to social graph objects will not affect the contents of the web page. Generally speaking, the social graph objects "clone" certain properties of the web page, and hence making changes to the clone will not affect the web page. However, the effect of such changes will be reflected in published (both retroactive and subsequent) content on the social media pages associated with the web page. For example, if a SGMS user replaces the image of a pre-created social graph object, then in every message (or post) published in social media pages associated with that social graph object, the previous image will be replaced by a new image.

Now turning to FIG. 9, a screenshot 900 is illustrated of an exemplary SGMS interface showing various pre-created social graph objects (similar to screenshot 600), by an embodiment of the SGMS as displayed to a SGMS user after logging in to the SGMS. As can be seen, in addition to the illustrative information displayed in screenshot 600, screenshot 900 also displays (in region 918) a newly created exemplary social graph object titled "How to make the perfect brew coffee", for an exemplary organization called Acme Coffee. As recited previously, this exemplary social graph object having an unique ID given by 240244 (displayed in region 608 of screenshot 900) is associated with the web page http://www.acmecoffee.com/ belonging to an organization called Acme Coffee. Further, it can be seen that the corresponding redirector page for the social graph object having an unique ID given by 240244 is located at http:///www.acmecoffeeexternaldomain.com/perfectbrew (displayed in region 612 of screenshot 900). Moreover, as seen from region 614, a SGMS user called Jeff created this exemplary social graph object on Jul. 7, 2011 at 10:24 AM. In addition, it can also be seen from region 616 that the contents on the web page http://www.acmecoffee.com/ associated with this social graph object has not yet been "liked" by any web visitor. Next, in the discussions that follow, screenshots of an exemplary web page before and after creating associations between the web page and social media systems, will be described.

FIG. 10 consisting of FIG. 10A and FIG. 10B displays screenshots 1000A and 1000B respectively of an exemplary web page before and after creating associations between the web page and social media systems, according to one embodiment of the present system. Specifically, the screenshots shown in FIG. 10A and FIG. 10B represent views, respectively, of a web page before and after a social graph object has been created therein. These screenshots are of a web page http://www.acmecoffee.com owned by an organization called Acme Coffee that is a seller of coffee. As seen in FIG. 10A, region 1002 displays various exemplary clickable buttons directed at marketing and promotions of Acme Coffee's products, and also dissemination of general information about coffee. For example, buttons that are displayed in 1000A include "Home", "Our Coffees", "Coffee ABC". "The Acme Coffee Plan", "Coffee and Well-being", and "My Acme Coffee". As will be understood, screenshots 1000A and 1000B are that of the home page (i.e. the web page http://www.acmecoffee.com) of Acme Coffee. Further, it can be seen that various buttons (typical of most web pages) are illustrated in region 1006. Examples of such buttons include "Terms and Conditions", "Privacy Policy", and "Contact Us". It will be understood that the screenshots shown here are for illustration only. According to aspects of the present disclosure, the contents of a web page generally have no bearing on creating associations between the web page with social media systems.

It is further shown in region 1004 that Acme Coffee provides further information in relation to historical origins of coffee, different kinds of coffee beans (for example, Arabica and Robusta), and also various aspects of coffee tasting. As seen in FIG. 10A, the screenshot of the web page does not indicate features or aspects of social media pages.

Now turning to FIG. 10B, a screenshot 1000B is shown illustrating a web page subsequent to creation of associations between the web page and social media systems, according to one embodiment of the present system. As can be seen from screenshot 1000B, region 1008 (titled "Share Your Acme Coffee Experience") displays various features and user activities related to users of social media systems (exemplarily, fictitious social media systems called. Eyetext and Scribble) on the web page of a hypothetical organization called Acme Coffee. Such features include an ILike button (an exemplary social media plugin of Eyetext) for recording and displaying the number of times (for example, 544,344) published content on this web page has been liked by web visitors visiting this web page, including the number of persons who review a summary of this web page on the Eyetext social media profile belonging to them or their friends on Eyetext. It can be further seen that the ILike button also displays names of persons (for example, a "John Doe") who liked the content on this web page and are on Eyetext, and moreover, are connected with the person reviewing this web page, on Eyetext. It will be understood that persons who like content published in this page can express their likes either by visiting this web page, or by reviewing a summary of this web page displayed on social media pages that have interconnections (by means of social graphs) with social media pages of persons or organizations that have expressed a like for the content published on this web page. Furthermore, although not shown herein, it will be understood that the ILike button, and a brief summary (showing title, url, an illustrative image etc.) of the web page appears in all the interconnected pages (exemplarily, all social media pages that are interconnected with the 544,344 social media pages) on Eyetext.

In addition to exemplary ILike plugin of social media system called Eyetext, as displayed on the web page of Acme Coffee in screenshot 1000B, features and user activities related to users of another social media system called Scribble are also illustrated. As can be seen from screenshot 1000B, a social media plugin called "Tag Me" of social media system called Scribble reveals that 2.3 million Scribble users have tagged Acme Coffee's social media page on Scribble.

Thus, as evidenced by FIG. 10B, section 1008 represents an open graph object for the web page illustrated in FIG. 10B. As will be understood and appreciated, web pages may include multiple open graph objects relating to various articles, videos, and other content on the web page. Or, as shown in FIG. 10B, web pages may include only a singular open graph object containing a singular social media plugin.

As described in detail above, aspects of the present disclosure generally relate to systems and methods for creating and managing associations between social media systems and web pages, using an embodiment of the social graph management system (SGMS) disclosed herein. In one embodiment, aspects of the present disclosure relate to an improved system or method for creating social graph objects within traditional web pages, and subsequently maintaining and managing the social graph objects and related information. According to yet another embodiment, aspects of the present disclosure relate to systems and methods for inserting social media plugins into web pages, and managing the use of, user interaction with, and information relating to the inserted social media plugins. In yet another embodiment, aspects of the present disclosure relate to systems and methods for creating and managing associations between social graphs (generated due to the interactions between individuals, organizations, and corporate entities on social media systems) and web pages owned by individuals, organizations and corporate entities. Social graphs are complex digital footprints of all such interactions, wherein owners of social media pages constitute the nodes of the social graph. As will be understood by one skilled in the art, owners of a social media page can belong to more than one social graph, and hence social graphs are overlapping in nature. Because of the complexities of interconnections in social graphs, social graphs are generally rendered on a computer with specialized application software.

It will be understood and appreciated that according to one embodiment, SGMS users who wish to create and manage associations between a web page and social media pages access the SGMS easily via an user interface over a computer network, such as the World Wide Web (WWW), using varying types of electronic devices such as smart phones and computers. In one embodiment, the SGMS receives information (such as a title, URL, and various other attributes) from SGMS users via an electronic user interface for purposes of creating intermediary page(s) that facilitate associations between social media pages and web pages, wherein in one embodiment, the intermediary page(s) function to direct traffic between social media pages and web pages. Further, the SGMS communicates via a network connection a request for activation of the intermediary page(s) to a respective social media system. Additionally, aspects of the present disclosure involve collection of analytics related to user activity from the intermediary page(s) for purposes of tracking user activity and interactions between the web page and persons visiting the web page.

Accordingly, it will be understood from the foregoing description that various embodiments of the present system described herein are generally implemented as a special purpose or general-purpose computer including various computer hardware as discussed in greater detail below. Embodiments within the scope of the present disclosure also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, the present disclosure is described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the present disclosure may be practiced in network computing environments with many types of computer system configurations, including personal computers, hand-held devices, multi-processor systems, microprocessor-based or programmable consumer electronics, networked PCs, minicomputers, mainframe computers, and the like. The present disclosure is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the present disclosure, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements nest of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the present disclosure will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which aspects of the present disclosure are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the present disclosure is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present disclosure, it readily will be understood by those persons skilled in the art that the present disclosure is susceptible to broad utility and application. While various aspects have been described in the context of a preferred embodiment, additional aspects, features, and methodologies of the present disclosure will be readily discernable from the description herein, by those of ordinary skill in the art. Many embodiments and adaptations of the present disclosure other than those herein described, as well as many variations, modifications, and equivalent arrangements and methodologies, will be apparent from or reasonably suggested by the present disclosure and the foregoing description thereof without departing from the substance or scope of the present disclosure. For example, in the disclosure presented herein, a social graph management system (SGMS) creates associations between web pages and social media pages hosted by social media systems. However, it will be understood by one skilled in the art, that in alternate embodiments, a SGMS can create associations between web pages and specialized application software (apps) hosted by social media systems. Generally speaking, apps refers to digital content that interacts with social media system users. Examples of apps include online quizzes, polls, electronic games, and various other media types that allow users to view specific information provided by the app, provide information to or interact with the app, etc.

Furthermore, any sequence(s) and/or temporal order of steps of various processes described and claimed herein are those considered to be the best mode contemplated for carrying out the present disclosure. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present disclosure. In addition, some steps may be carried out simultaneously.

Accordingly, while the present disclosure has been described herein in detail in relation to preferred embodiments, it is to be understood that this disclosure is only illustrative and exemplary of the present disclosure and is made merely for purposes of providing a fill and enabling disclosure. The foregoing disclosure is not intended nor is to be construed to limit the present disclosure or otherwise to exclude any such other embodiments, adaptations, variations, modifications and equivalent arrangements, the present disclosure being limited only by the claims appended hereto and the equivalents thereof.

What is claimed is:

1. A method comprising:
  receiving, by a social graph management system (SGMS) hosted on a computer server and from a SGMS user having inputted information into an electronic user interface of the SGMS, (1) a selection of a social media system from a plurality of social media systems, and (2) message content including media content specified by the SGMS user to be published on the social media system;
  creating, by the SGMS, a social graph object as a data structure mapping each of (a) a first uniform resource locator (URL) of a first web page external to the social media system, (b) a redirection URL, and (c) the social media system to each other, the SGMS creating the social graph object using a computer programming protocol followed by the social media system for embedding content into web pages maintained outside the plurality of social media systems;
  creating, by the SGMS, at least one intermediary page using meta tags provided by the social media system as well as metadata corresponding to the selection of the social media system and to the message content to perform the creating of the at least one intermediary page, wherein the at least one intermediary page enables transmission of information between the social media system and the first web page external to the social media system;
  based on validating and activating of the social graph object as a result of the social media system reading the metadata and the meta tags contained on the at least one intermediary page, generating, by the SGMS, computer code defining the message content and an interactive social media system plugin, the computer code specifying (d) a link between the interactive social media system plugin and a social media page hosted by the social media system, and (e) the message content including the redirection URL;
  providing, by the SGMS, the computer code to be embedded within the first web page to enable network communication between the first web page, the at least one intermediary page, and the social media system;
  detecting, by the SGMS, a user interaction by a web page visitor with the interactive social media system plugin displayed on the first web page;
  communicating, by the SGMS, a notification of the user interaction to the social media system for posting the user interaction by the web page visitor on a first social media page, associated with the web page visitor, on the social media system;
  publishing, responsive to the user interaction with the interactive social media system plugin, a message to the first social media page in the social media system, wherein the message comprises the message content including a link to the redirection URL, the link to the redirection URL allowing members of the social media system that have access to the first social media page to select the link to the redirection URL and be directed to the first web page external to the social media system;
  receiving, from a first member of the social media system who has access to the first social media page, a first request based on a first user selection of the link to the redirection URL via the message in the social media system;

based on the social graph object, determining, by the SGMS, that the redirection URL is mapped to the first URL and corresponds to the at least one intermediary page;

based on the determination that the redirection URL is mapped to the first URL, redirecting the first request to the first URL to route the first request from the at least one intermediary page to the first web page;

updating, by the SGMS, the social graph object using URL information obtained from the electronic user interface of the SGMS including a second URL that is different from the first URL, the updating comprising replacing the first URL with the second URL in the data structure of the social graph object, as well as mapping each of the second URL, the redirection URL and the social media system to each other;

receiving, by the SGMS, after updating the social graph object, a second request from a second member of the social media system who has access to the first social media page, wherein receiving the second request is based on a second user selection of the link to the redirection URL via the message in the social media system;

based on the social graph object, determining by the SGMS that the redirection URL is mapped to the second URL and corresponds to the at least one intermediary page;

based on the determination that the redirection URL is mapped to the second URL, redirecting the second request to the second URL instead of the first URL to route the second member of the social media system from the at least one intermediary page to a second web page; and collecting, by the SGMS, user analytic information based on user visits to the at least one intermediary page of the SGMS to track persons visiting the first web page, the second web page and associated social media pages of the social media system, wherein the method is performed by at least one device comprising a hardware processor.

2. The method of claim 1, wherein the first web page, into which the interactive social media system plugin is inserted, is accessible at the first URL before updating the social graph object, and wherein the second web page is accessible at the second URL after updating the social graph object.

3. The method of claim 1, further comprising:
transmitting a third request, to the social media system, for validation of the social graph object; and
receiving, from the social media system, validation of the social graph object,
wherein the updating of the social graph object is performed after receiving the validation of the social graph object.

4. The method of claim 3, wherein the at least one intermediary page comprises a pseudo page, and
wherein the transmitting the third request comprises:
generating the metadata associated with the social graph object; and
storing the metadata in the pseudo page,
wherein the validation includes the social media system crawling the pseudo page to read the metadata from the pseudo page.

5. The method of claim 4, wherein the at least one intermediary page comprises a redirection page and the pseudo page which are accessible at a same URL.

6. The method of claim 4, wherein the metadata stored in the pseudo page comprises an administration identifier provided by the social media system.

7. The method of claim 1, further comprising:
responsive to user interactions with the interactive social media system plugin, storing user analytics data associated with the social graph object.

8. The method of claim 7, wherein after replacing the first URL with the second URL, storing an association between the social graph object and user analytics data before updating the social graph object.

9. The method of claim 7, further comprising:
presenting the user analytics data in the electronic user interface associated with the social graph object.

10. The method of claim 1, wherein the at least one intermediary page includes a redirection page which is hosted in a first domain, and
wherein the first web page is hosted in a second domain that is different from the first domain.

11. A non-transitory computer readable medium comprising instructions which, when executed by one or more hardware processors, cause performance of operations comprising:

receiving, by a social graph management system (SGMS) hosted on a computer server and from a SGMS user having inputted information into an electronic user interface of the SGMS, (1) a selection of a social media system from a plurality of social media systems, and (2) message content including media content specified by the SGMS user to be published on the social media system;

creating, by the SGMS, a social graph object as a data structure mapping each of (a) a first uniform resource locator (URL) of a first web page external to the social media system, (b) a redirection URL, and (c) the social media system to each other, the SGMS creating the social graph object using a computer programming protocol followed by the social media system for embedding content into web pages maintained outside the plurality of social media systems;

creating, by the SGMS, at least one intermediary page using meta tags provided by the social media system as well as metadata corresponding to the selection of the social media system and to the message content to perform the creating of the at least one intermediary page, wherein the at least one intermediary page enables transmission of information between the social media system and the first web page external to the social media system;

based on validating and activating of the social graph object as a result of the social media system reading the metadata and the meta tags contained on the at least one intermediary page, generating, by the SGMS, computer code defining the message content and an interactive social media system plugin, the computer code specifying (d) a link between the interactive social media system plugin and a social media page hosted by the social media system, and (e) the message content including the redirection URL;

providing, by the SGMS, the computer code to be embedded within the first web page to enable network communication between the first web page, the at least one intermediary page, and the social media system;

detecting, by the SGMS, a user interaction by a web page visitor with the interactive social media system plugin displayed on the first web page;

communicating, by the SGMS, a notification of the user interaction to the social media system for posting the user interaction by the web page visitor on a first social media page, associated with the web page visitor, on the social media system;

publishing, responsive to the user interaction with the interactive social media system plugin, a message to the first social media page in the social media system, wherein the message comprises the message content including a link to the redirection URL, the link to the redirection URL allowing members of the social media system that have access to the first social media page to select the link to the redirection URL and be directed to the first web page external to the social media system;

receiving, from a first member of the social media system who has access to the first social media page, a first request based on a first user selection of the link to the redirection URL via the message in the social media system;

based on the social graph object, determining, by the SGMS, that the redirection URL is mapped to the first URL and corresponds to the at least one intermediary page;

based on the determination that the redirection URL is mapped to the first URL, redirecting the first request to the first URL to route the first request from the at least one intermediary page to the first web page;

updating, by the SGMS, the social graph object using URL information obtained from the electronic user interface of the SGMS including a second URL that is different from the first URL, the updating comprising replacing the first URL with URL the second URL in the data structure of the social graph object, as well as mapping each of the second URL, the redirection URL and the social media system to each other;

receiving, by the SGMS, after updating the social graph object, a second request from a second member of the social media system who has access to the first social media page, wherein receiving the second request is based on a second user selection of the link to the redirection URL via the message in the social media system;

based on the social graph object, determining by the SGMS that the redirection URL is mapped to the second URL and corresponds to the at least one intermediary page;

based on the determination that the redirection URL is mapped to the second URL, redirecting the second request to the second URL instead of the first URL to route the second member of the social media system from the at least one intermediary page to a second web page; and collecting, by the SGMS, user analytic information based on user visits to the at least one intermediary page of the SGMS to track persons visiting the first web page, the second web page, and associated social media pages of the social media system.

12. The medium of claim 11, wherein the first web page, into which the interactive social media system plugin is inserted, is accessible at the first URL before updating the social graph object, and wherein the second web page is accessible at the second URL after updating the social graph object.

13. The medium of claim 11, the operations further comprising:

transmitting a third request, to the social media system, for validation of the social graph object; and receiving, from the social media system, validation of the social graph object, wherein the updating of the social graph object is performed after receiving the validation of the social graph object.

14. The medium of claim 13, wherein the at least one intermediary page comprises a pseudo page, and wherein transmitting the third request comprises:
generating the metadata associated with the social graph object; and
storing the metadata in the pseudo page, wherein the validation includes the social media system crawling the pseudo page to read the metadata from the pseudo page.

15. A system comprising:

at least one device including a hardware processor;

the system being configured to perform operations comprising:

receiving, by a social graph management system (SGMS) hosted on a computer server and from a SGMS user having inputted information into an electronic user interface of the SGMS, (1) a selection of a social media system from a plurality of social media systems, and (2) message content including media content specified by the SGMS user to be published on the social media system;

creating, by the SGMS, a social graph object as a data structure mapping each of (a) a first uniform resource locator (URL) of a first web page external to the social media system, (b) a redirection URL, and (c) the social media system to each other, the SGMS creating the social graph object using a computer programming protocol followed by the social media system for embedding content into web pages maintained outside the plurality of social media systems;

creating, by the SGMS, at least one intermediary page using meta tags provided by the social media system as well as metadata corresponding to the selection of the social media system and to the message content to perform the creating of the at least one intermediary page, wherein the at least one intermediary page enables transmission of information between the social media system and the first web page external to the social media system;

based on validating and activating of the social graph object as a result of the social media system reading the metadata and the meta tags contained on the at least one intermediary page, generating, by the SGMS, computer code defining the message content and an interactive social media system plugin, the computer code specifying (d) a link between the interactive social media system plugin and a social media page hosted by the social media system, and (e) the message content including the redirection URL;

providing, by the SGMS, the computer code to be embedded within the first web page to enable network communication between the first web page, the at least one intermediary page, and the social media system;

detecting, by the SGMS, a user interaction by a web page visitor with the interactive social media system plugin displayed on the first web page;

communicating, by the SGMS, a notification of the user interaction to the social media system for posting the user interaction by the web page visitor on a first social media page, associated with the web page visitor, on the social media system;

publishing, responsive to the user interaction with the interactive social media system plugin, a message to the first social media page in the social media system, wherein the message comprises the message content including a link to the redirection URL, the link to the redirection URL allowing members of the social media system that have access to the first social media page to select the link to the redirection URL and be directed to the first web page external to the social media system;

receiving, from a first member of the social media system who has access to the first social media page, a first request based on a first user selection of the link to the redirection URL via the message in the social media system;

based on the social graph object, determining, by the SGMS, that the redirection URL is mapped to the first URL and corresponds to the at least one intermediary page;

based on the determination that the redirection URL is mapped to the first URL, redirecting the first request to the first URL to route the first request from the at least one intermediary page to the first web page;

updating, by the SGMS, the social graph object using URL information obtained from the electronic user interface of the SGMS including a second URL that is different from the first URL, the updating comprising replacing the first URL with the second URL in the data structure of the social graph object, as well as mapping each of the second URL, the redirection URL and the social media system to each other;

receiving, by the SGMS, after updating the social graph object, a second request from a second member of the social media system who has access to the first social media page, wherein receiving the second request is based on a second user selection of the link to the redirection URL via the message in the social media system;

based on the social graph object, determining by the SGMS that the redirection URL is mapped to the second URL and corresponds to the at least one intermediary page;

based on the determination that the redirection URL is mapped to the second URL, redirecting the second request to the second URL instead of the first URL to route the second member of the social media system from the at least one intermediary page to a second web page; and collecting, by the SGMS, user analytic information based on user visits to the at least one intermediary page of the SGMS to track persons visiting the first web page, the second web page, and associated social media pages of the social media system.

16. The system of claim 15, wherein the first web page, into which the interactive social media system plugin is inserted, is accessible at the first URL before updating the social graph object, and wherein the second web page is accessible at the second URL after updating the social graph object.

17. The system of claim 15, the operations further comprising:
transmitting a third request, to the social media system, for validation of the social graph object; and
receiving, from the social media system, validation of the social graph object,
wherein the updating of the social graph object is performed after receiving the validation of the social graph object.

18. The system of claim 17, wherein the at least one intermediary page comprises a pseudo page, and
wherein the transmitting the third request comprises:
generating the metadata associated with the social graph object; and
storing the metadata in the pseudo page,
wherein the validation includes the social media system crawling the pseudo page pseudo page to read the metadata from the pseudo page.

* * * * *

UNITED STATES PATENT AND TRADEMARK OFFICE
CERTIFICATE OF CORRECTION

PATENT NO. : 11,483,265 B2
APPLICATION NO. : 16/101007
DATED : October 25, 2022
INVENTOR(S) : Michael J. Strutton It is certified that error appears in the above-identified patent and that said Letters Patent is hereby corrected as shown below:

On the Title Page

On page 3, Column 2, item (56) under Other Publications, Line 14, delete "etal.," and insert -- et al., --, therefor.

On page 3, Column 2, item (56) under Other Publications, Line 63, delete "Howto" and insert -- How to --, therefor.

On page 4, Column 2, item (56) under Other Publications, Line 4, delete "Dorn," and insert -- Dom, --, therefor.

On page 4, Column 2, item (56) under Other Publications, Line 7, delete "datad" and insert -- dated --, therefor.

On page 4, Column 2, item (56) under Other Publications, Line 13, delete "Encylopaedia" and insert -- Encyclopedia --, therefor.

In the Specification

In Column 1, Line 20, delete "elates" and insert -- relates --, therefor.

In Column 3, Line 42, delete "for" and insert -- (for --, therefor.

In Column 4, Line 39, delete "too" and insert -- to --, therefor.

In Column 5, Line 46, delete "datatable" and insert -- data table --, therefor.

In Column 7, Line 29, delete "1110" and insert -- 110 --, therefor.

In Column 7, Line 61, delete "system" and insert -- system (e.g., --, therefor.

Signed and Sealed this
Thirtieth Day of May, 2023

Katherine Kelly Vidal
*Director of the United States Patent and Trademark Office*

CERTIFICATE OF CORRECTION (continued)
U.S. Pat. No. 11,483,265 B2

In Column 9, Line 36, delete ""type"" and insert -- "type", --, therefor.

In Column 14, Line 26, delete "creating," and insert -- creating --, therefor.

In Column 16, Line 9, delete "of:" and insert -- of --, therefor.

In Column 26, Line 7, delete "iLike" and insert -- ILike --, therefor.

In Column 27, Line 66, delete "called." and insert -- called --, therefor.

In Column 30, Line 44, delete "nest" and insert -- most --, therefor.

In Column 31, Line 32, delete "thereof" and insert -- thereof, --, therefor.

In Column 31, Line 64, delete "fill" and insert -- full --, therefor.

In the Claims

In Column 35, Line 32, in Claim 11, delete "with URL" and insert -- with --, therefor.

In Column 38, Line 36, in Claim 18, delete "pseudo page pseudo page" and insert -- pseudo page --, therefor.